United States Patent
Boyd

(10) Patent No.: US 11,924,321 B1
(45) Date of Patent: Mar. 5, 2024

(54) SYSTEM AND METHOD FOR ENCRYPTING AND COMPRESSING BLOCKS OF DATA

(71) Applicant: MEMOTECH AI, LLC, San Jose, CA (US)

(72) Inventor: Geoffrey Arthur Boyd, San Jose, CA (US)

(*) Notice: Subject to any disclaimer, the term of this patent is extended or adjusted under 35 U.S.C. 154(b) by 280 days.

(21) Appl. No.: 17/323,788

(22) Filed: May 18, 2021

Related U.S. Application Data

(63) Continuation-in-part of application No. 15/987,894, filed on May 23, 2018, now Pat. No. 11,012,089.

(51) Int. Cl.
| | |
|---|---|
| H04L 9/00 | (2022.01) |
| G06F 17/16 | (2006.01) |
| H04L 9/06 | (2006.01) |
| H04L 9/08 | (2006.01) |

(52) U.S. Cl.
CPC ............ *H04L 9/008* (2013.01); *G06F 17/16* (2013.01); *H04L 9/0618* (2013.01); *H04L 9/0825* (2013.01); *H04L 9/0861* (2013.01)

(58) Field of Classification Search
CPC ..... H04L 9/008; H04L 9/0618; H04L 9/0825; H04L 9/0861; G06F 17/16
See application file for complete search history.

(56) References Cited

U.S. PATENT DOCUMENTS

| | | | | |
|---|---|---|---|---|
| 6,766,345 | B2* | 7/2004 | Stein | G06F 7/724 708/492 |
| 2010/0122143 | A1* | 5/2010 | Lee | H04J 13/0003 714/752 |
| 2011/0202587 | A1* | 8/2011 | Chabot | G06F 15/7867 708/492 |
| 2011/0206118 | A1* | 8/2011 | Bivolarsky | H04N 19/94 375/240.18 |
| 2015/0263852 | A1* | 9/2015 | Alon | H04L 9/0618 380/28 |
| 2017/0041132 | A1* | 2/2017 | Nicholls | H04L 9/0825 |

* cited by examiner

*Primary Examiner* — Noura Zoubair
*Assistant Examiner* — Zoha Piyadehghibi Tafaghodi
(74) *Attorney, Agent, or Firm* — MINISANDRAM LAW FIRM; Raghunath S. Minisandram

(57) ABSTRACT

A system and method to transform a block of data is disclosed. A block of original data is retrieved from a data store, block of original data including a N number of words, each word including one or more bits of data. A multiplier matrix is provided, the multiplier matrix having N×N words, a plurality of sub matrices arranged diagonally within the N×N matrix, with each of the sub matrix arranged as a binomial matrix. All the words in the multiplier matrix not part of the sub matrix are set to zero. Each of the sub matrix is represented as a product of a plurality of lower factorized matrix, a plurality of upper factorized matrix and a shift matrix. The block of original data is multiplied with the multiplier matrix to generate a transformed block of original data with N number of words.

22 Claims, 29 Drawing Sheets

| Row | 210 | | 402 |
|---|---|---|---|
| | | | \|d\| |
| 1 | 48 | s0 | |
| 2 | -8 | d1 | 8 |
| 3 | 0 | d2 | 0 |
| 4 | 0 | d3 | 0 |
| 5 | 0 | d4 | 0 |
| 6 | 271 | s0 | |
| 7 | -15 | d1 | 15 |
| 8 | -1 | d2 | 1 |
| 9 | 1 | d3 | 1 |
| 10 | -1 | d4 | 1 |
| 11 | 1 | d5 | 1 |
| 12 | 40 | s0 | |
| 13 | 0 | d1 | 0 |
| 14 | 0 | d2 | 0 |
| 15 | 637 | s0 | |
| 16 | 29 | d1 | 29 |
| 17 | -3 | d2 | 3 |
| 18 | -3 | d3 | 3 |
| 19 | -3 | d4 | 3 |
| 20 | -3 | d5 | 3 |
| 21 | -3 | d6 | 3 |
| 22 | 36 | s0 | |
| 23 | 4 | d1 | 4 |
| 24 | 0 | d2 | 0 |
| 25 | 0 | d3 | 0 |
| 26 | 20 | s0 | |
| 27 | -2 | d1 | 2 |
| 28 | 0 | d2 | 0 |

AGGREGATE ENERGY = 2.78

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 128 | s0 |
| 7 | -8 | d1 |
| 8 | 0 | d2 |
| 9 | 0 | d3 |
| 10 | 0 | d4 |
| 11 | 80 | s0 |
| 12 | 0 | d1 |
| 13 | 0 | d2 |
| 14 | 0 | d3 |
| 15 | 637 | s0 |
| 16 | 29 | d1 |
| 17 | -3 | d2 |
| 18 | -3 | d3 |
| 19 | -3 | d4 |
| 20 | -3 | d5 |
| 21 | -3 | d6 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 | 0 |

AGGREGATE ENERGY = 2.69

FIGURE 6A 508-2

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 60 | s0 |
| 7 | -4 | d1 |
| 8 | 0 | d2 |
| 9 | 0 | d3 |
| 10 | 160 | s0 |
| 11 | 0 | d1 |
| 12 | 0 | d2 |
| 13 | 0 | d3 |
| 14 | 0 | d4 |
| 15 | 637 | s0 |
| 16 | 29 | d1 |
| 17 | -3 | d2 |
| 18 | -3 | d3 |
| 19 | -3 | d4 |
| 20 | -3 | d5 |
| 21 | -3 | d6 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.69

FIGURE 7A

| Row | 508-3 | |
|---|---|---|
| 1 | 48 | s0 |
| 2 | -8 | d1 |
| 3 | 0 | d2 |
| 4 | 0 | d3 |
| 5 | 0 | d4 |
| 6 | 28 | s0 |
| 7 | -2 | d1 |
| 8 | 0 | d2 |
| 9 | 319 | s0 |
| 10 | -1 | d1 |
| 11 | -1 | d2 |
| 12 | -1 | d3 |
| 13 | -1 | d4 |
| 14 | -1 | d5 |
| 15 | 637 | s0 |
| 16 | 29 | d1 |
| 17 | -3 | d2 |
| 18 | -3 | d3 |
| 19 | -3 | d4 |
| 20 | -3 | d5 |
| 21 | -3 | d6 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.84

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 60 | s0 |
| 7 | -4 | d1 |
| 8 | 0 | d2 |
| 9 | 0 | d3 |
| 10 | 160 | s0 |
| 11 | 0 | d1 |
| 12 | 0 | d2 |
| 13 | 0 | d3 |
| 14 | 0 | d4 |
| 15 | 637 | s0 |
| 16 | 29 | d1 |
| 17 | -3 | d2 |
| 18 | -3 | d3 |
| 19 | -3 | d4 |
| 20 | -3 | d5 |
| 21 | -3 | d6 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.69

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 60 | s0 |
| 7 | -4 | d1 |
| 8 | 0 | d2 |
| 9 | 0 | d3 |
| 10 | 320 | s0 |
| 11 | 0 | d1 |
| 12 | 0 | d2 |
| 13 | 0 | d3 |
| 14 | 0 | d4 |
| 15 | 0 | d5 |
| 16 | 304 | s0 |
| 17 | 16 | d1 |
| 18 | 0 | d2 |
| 19 | 0 | d3 |
| 20 | 0 | d4 |
| 21 | 0 | d5 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.5

| Row | Value | Label |
|---|---|---|
| 1 | 48 | s0 |
| 2 | -8 | d1 |
| 3 | 0 | d2 |
| 4 | 0 | d3 |
| 5 | 0 | d4 |
| 6 | 60 | s0 |
| 7 | -4 | d1 |
| 8 | 0 | d2 |
| 9 | 0 | d3 |
| 10 | 642 | s0 |
| 11 | -2 | d1 |
| 12 | 2 | d2 |
| 13 | -2 | d3 |
| 14 | 2 | d4 |
| 15 | -2 | d5 |
| 16 | 2 | d6 |
| 17 | 144 | s0 |
| 18 | 8 | d1 |
| 19 | 0 | d2 |
| 20 | 0 | d3 |
| 21 | 0 | d4 |
| 22 | 36 | s0 |
| 23 | 4 | d1 |
| 24 | 0 | d2 |
| 25 | 0 | d3 |
| 26 | 20 | s0 |
| 27 | -2 | d1 |
| 28 | 0 | d2 |

AGGREGATE ENERGY = 2.69

FIGURE 11A

| Row | 1202 |   | Row | 208 |
|---|---|---|---|---|
| 1 | 16 |  | 1 | 1 |
| 2 | 32 |  | 2 | 2 |
| 3 | 48 |  | 3 | 3 |
| 4 | 64 |  | 4 | 4 |
| 5 | 80 |  | 5 | 5 |
| 6 | 48 |  | 6 | 6 |
| 7 | 56 |  | 7 | 7 |
| 8 | 64 |  | 8 | 8 |
| 9 | 72 |  | 9 | 9 |
| 10 | 320 |  | 10 | 10 |
| 11 | 320 |  | 11 | 10 |
| 12 | 320 |  | 12 | 10 |
| 13 | 320 |  | 13 | 10 |
| 14 | 320 |  | 14 | 10 |
| 15 | 320 |  | 15 | 10 |
| 16 | 384 |  | 16 | 12 |
| 17 | 352 |  | 17 | 11 |
| 18 | 320 |  | 18 | 10 |
| 19 | 288 |  | 19 | 9 |
| 20 | 256 |  | 20 | 8 |
| 21 | 224 |  | 21 | 7 |
| 22 | 48 |  | 22 | 6 |
| 23 | 40 |  | 23 | 5 |
| 24 | 32 |  | 24 | 4 |
| 25 | 24 |  | 25 | 3 |
| 26 | 16 |  | 26 | 4 |
| 27 | 20 |  | 27 | 5 |
| 28 | 24 |  | 28 | 6 |

FIGURE 12A $$212e\ B4 \begin{vmatrix} 1 & 3 & 3 & 1 \\ 1 & 1 & -1 & -1 \\ 1 & -1 & -1 & 1 \\ 1 & -3 & 3 & -1 \end{vmatrix} \times IP4\begin{vmatrix} a \\ b \\ c \\ d \end{vmatrix} \underset{1332}{=} \begin{vmatrix} a+3b+3c+d \\ a+b-c-d \\ a-b-c+d \\ a-3b+3c-d \end{vmatrix} OP4\ 1333$$

$$1301\ U1\begin{vmatrix} 1 & 1 & 0 & 0 \\ 0 & 1 & 1 & 0 \\ 0 & 0 & 1 & 1 \\ 0 & 0 & 0 & 1 \end{vmatrix} \times IP4\begin{vmatrix} a \\ b \\ c \\ d \end{vmatrix} \underset{1332}{=} \begin{vmatrix} a+b \\ b+c \\ c+d \\ d \end{vmatrix} PP1\ 1334$$

$$1302\ U2\begin{vmatrix} 1 & 1 & 0 & 0 \\ 0 & 1 & 1 & 0 \\ 0 & 0 & 1 & 0 \\ 0 & 0 & 0 & 1 \end{vmatrix} \times PP1\begin{vmatrix} a+b \\ b+c \\ c+d \\ d \end{vmatrix} \underset{1334}{=} \begin{vmatrix} a+2b+c \\ b+2c+d \\ c+d \\ d \end{vmatrix} PP2\ 1336$$

$$1303\ U3\begin{vmatrix} 1 & 1 & 0 & 0 \\ 0 & 1 & 0 & 0 \\ 0 & 0 & 1 & 0 \\ 0 & 0 & 0 & 1 \end{vmatrix} \times PP2\begin{vmatrix} a+2b+c \\ b+2c+d \\ c+d \\ d \end{vmatrix} \underset{1336}{=} \begin{vmatrix} a+3b+3c+d \\ b+2c+d \\ c+d \\ d \end{vmatrix} PP3\ 1338$$

$$1330\ S4\begin{vmatrix} 1 & 0 & 0 & 0 \\ 0 & -2 & 0 & 0 \\ 0 & 0 & 4 & 0 \\ 0 & 0 & 0 & -8 \end{vmatrix} \times PP3\begin{vmatrix} a+3b+3c+d \\ b+2c+d \\ c+d \\ d \end{vmatrix} \underset{1338}{=} \begin{vmatrix} a+3b+3c+d \\ -2(b+2c+d) \\ 4(c+d) \\ -8d \end{vmatrix} PP4\ 1340$$

$$1321\ L1\begin{vmatrix} 1 & 0 & 0 & 0 \\ 1 & 1 & 0 & 0 \\ 0 & 1 & 1 & 0 \\ 0 & 0 & 1 & 1 \end{vmatrix} \times PP4\begin{vmatrix} a+3b+3c+d \\ -2(b+2c+d) \\ 4(c+d) \\ -8d \end{vmatrix} \underset{1340}{=} \begin{vmatrix} a+3b+3c+d \\ a+b-c-d \\ -2b+2d \\ 4c-4d \end{vmatrix} PP5\ 1342$$

$$1322\ L2\begin{vmatrix} 1 & 0 & 0 & 0 \\ 0 & 1 & 0 & 0 \\ 0 & 1 & 1 & 0 \\ 0 & 0 & 1 & 1 \end{vmatrix} \times PP5\begin{vmatrix} a+3b+3c+d \\ a+b-c-d \\ -2b+2d \\ 4c-4d \end{vmatrix} \underset{1342}{=} \begin{vmatrix} a+3b+3c+d \\ a+b-c-d \\ a-b-c+d \\ -2b+4c-2d \end{vmatrix} PP6\ 1344$$

$$1323\ L3\begin{vmatrix} 1 & 0 & 0 & 0 \\ 0 & 1 & 0 & 0 \\ 0 & 0 & 1 & 0 \\ 0 & 0 & 1 & 1 \end{vmatrix} \times PP6\begin{vmatrix} a+3b+3c+d \\ a+b-c-d \\ a-b-c+d \\ -2b+4c-2d \end{vmatrix} \underset{1344}{=} \begin{vmatrix} a+3b+3c+d \\ a+b-c-d \\ a-b-c+d \\ a-3b+3c-d \end{vmatrix} OP4\ 1333$$

FIGURE 13

|   | 1 | 2 | 3 | 4 | 5 |
|---|---|---|---|---|---|
| 1 | 1 | 4 | 6 | 4 | 1 |
| 2 | 1 | 2 | 0 | -2 | -1 |
| 3 | 1 | 0 | -2 | 0 | 1 |
| 4 | 1 | -2 | 0 | 2 | -1 |
| 5 | 1 | -4 | 6 | -4 | 1 |

1502

×

| 33 |
| 253 |
| 51 |
| 12 |
| 147 |

1504

=

| 1546 |
| 368 |
| 78 |
| -596 |
| -574 |

SYSTEM AND METHOD FOR ENCRYPTING AND COMPRESSING BLOCKS OF DATA

RELATED APPLICATION

This application is a continuation-in-part application of and claims priority to U.S. patent application Ser. No. 15/987,894 filed on May 23, 2018 and entitled "SYSTEM AND METHOD FOR ENCRYPTING AND COMPRESSING BLOCKS OF DATA". The disclosure of U.S. patent application Ser. No. 15/987,894 is incorporated herein by reference in their entirety, as if set out in full.

TECHNICAL FIELD

The present invention relates generally to encryption and compression of data and more specifically, encryption and compression of blocks of data.

DESCRIPTION OF RELATED ART

Information in the form of data is generally transferred from a source device to a destination device. In some examples, the information may be transferred as blocks of data. As the value of the information increases, there is a need to protect the information during a storage phase (sometimes referred to as "data at rest"), when the information is stored in a data store. Further, in some examples, there is a need to protect the information during a transmission phase, when the information is transmitted from one location or a source to another location or a destination (sometimes referred to as "data in transit").

It may be beneficial to provide an encryption system to encrypt the information in the form of data blocks. In some examples, it may also be beneficial to encrypt the data in a form that is conducive to better compression, for example, providing an improved compression ratio.

With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method to transform a block of data is disclosed. A block of original data is retrieved from a data store, block of original data including a N number of words, each word including one or more bits of data. A multiplier matrix is provided. The multiplier matrix has N×N words, a plurality of sub matrices arranged diagonally within the N×N matrix, with each of the sub matrix arranged as a binomial matrix, and all the words in the multiplier matrix not part of the sub matrix is set to zero. Each of the sub matrix is represented as a product of a plurality of lower factorized matrix, a plurality of upper factorized matrix and a shift matrix. The block of original data is multiplied with the multiplier matrix, with each of the sub matrix is represented as a product of a plurality of lower factorized matrix, a plurality of upper factorized matrix and a shift matrix to generate a block of modified original data with N number of words.

In another embodiment, a system to transform a block of data is disclosed. An encryption engine is configured to retrieve a block of original data from a data store, block of original data including a N number of words, each word including one or more bits of data. A multiplier matrix is provided. The multiplier matrix has N×N words, a plurality of sub matrices arranged diagonally within the N×N matrix, with each of the sub matrix arranged as a binomial matrix, and all the words in the multiplier matrix not part of the sub matrix is set to zero. Each of the sub matrix is represented as a product of a plurality of lower factorized matrix, a plurality of upper factorized matrix and a shift matrix. The block of original data is multiplied with the multiplier matrix, with each of the sub matrix is represented as a product of a plurality of lower factorized matrix, a plurality of upper factorized matrix and a shift matrix to generate a block of modified original data with N number of words.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following figures:

FIG. 4 shows the example modified original data matrix of FIG. 3, with corresponding aggregate energy of the modified original data matrix, according to an aspect of the present disclosure;

FIGS. 6A, 7A, 8A, 9A, 10A and 11A shows example interim modified original data matrix of FIGS. 6, 7, 8, 9, 10 and 11 respectively, along with corresponding aggregate energy of the interim modified original data matrix, according to an aspect of the present disclosure;

FIG. 12A shows interim original data matrix of FIG. 12 and regenerated original data matrix, according to an aspect of the present disclosure;

FIG. 13 shows an example sub matrix, with a plurality of upper factorized matrix, a plurality of lower factorized matrix and a shift matrix, according to an aspect of the present disclosure;

FIG. 15 shows another example sub matrix multiplication, according to an aspect of the present disclosure;

DETAILED DESCRIPTION

To facilitate an understanding of the adaptive aspects of the present disclosure, an example encryption system will be described. The specific construction and operation of the adaptive aspects of various elements of the example encryption system will be further described with reference to the encryption system.

Figure 1:
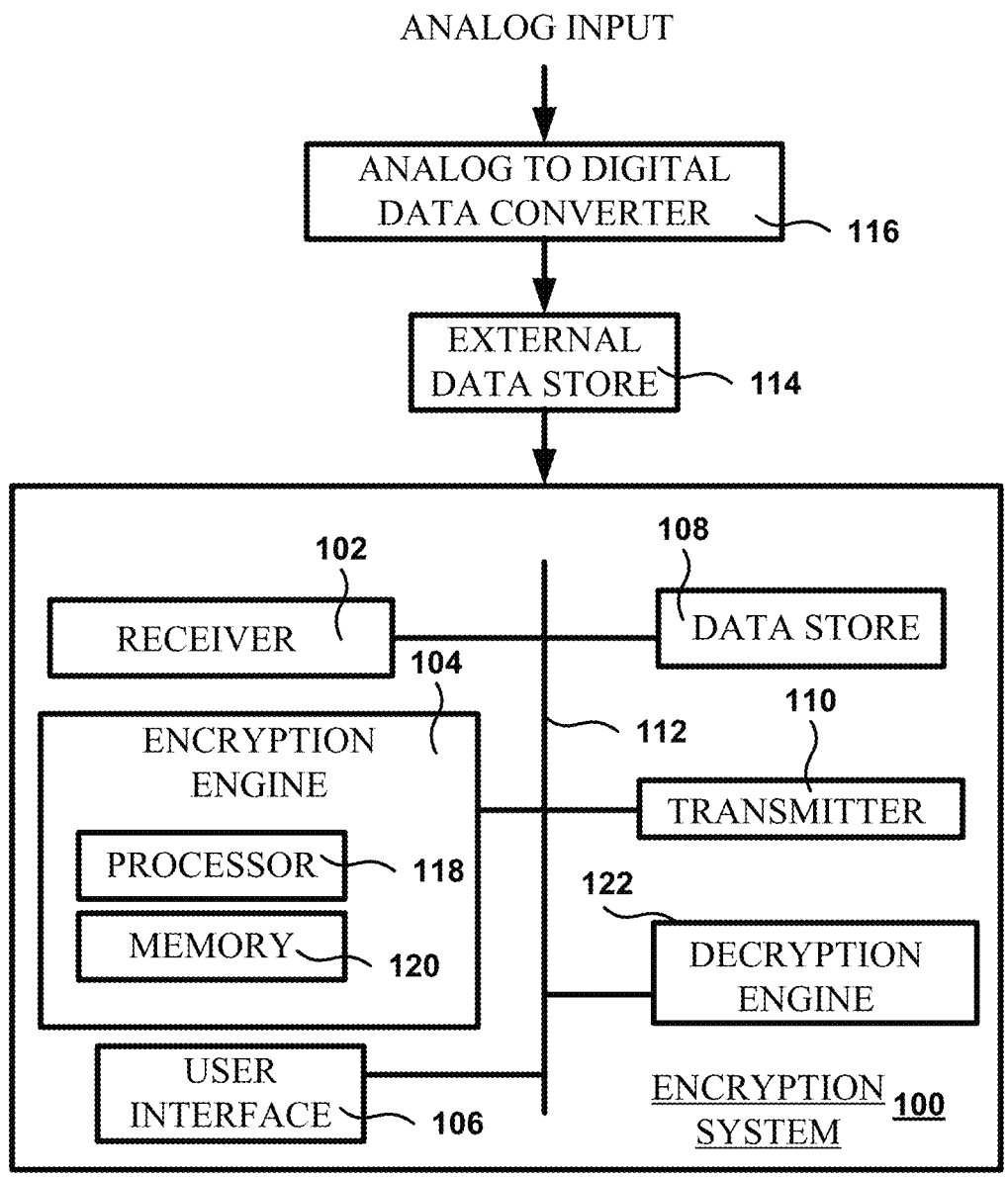
FIG. 1 shows an example encryption system, according to one aspect of the present disclosure.

FIG. 1 shows an example block diagram of an encryption system 100. The encryption system 100 includes a receiver 102, an encryption engine 104, a user interface 106, a data store 108 and a transmitter 110, all configured to communicate with each other over a bus 112. In one example, the encryption system 100 further includes a decryption engine 122. The encryption system 100 may be part of a computing system (not shown) with various computing, storage, input and output devices.

The receiver 102 may be configured to receive data from a source, for example, a source external to the encryption system 100. In one example, the receiver may receive one or more blocks of data. In one example, the receiver 102 may be configured to receive or retrieve one of more blocks of data from an external data store 114. In one example, the blocks of data may correspond to an audio or visual data stored in a digital form. In one example, the audio or video data may initially be in an analog data form, which has been converted to digital data form, for example, by an analog to digital converter 116.

The encryption engine 104 includes a processor 118 and a memory 120. The processor 118 may be configured to perform various arithmetic and logical computations. The memory 120 may be used to store and retrieve various transient and permanent data to be used by the encryption engine 104. The decryption engine 122 may be similar to the encryption engine and may include a processor and a memory (not shown) and perform similar to the encryption engine, however, decrypt the input data encrypted by the encryption engine 104. Further functions and features of the encryption engine 104 and decryption engine 122 will be later described with reference to FIG. 2, 2A and various example implementations described in this disclosure.

User interface 106 may be configured to provide a user access to various functions and features of the encryption system 100. In some examples, the user interface 106 may interact with an input device or an output device, to provide an interface to communicate with the encryption system 100. In one example, the user interface 106 may provide access to various administrative functions of the encryption system 100. In some examples, the user interface 106 may provide access to set up and configuration fields of the encryption system 100. In some examples, the user interface 106 may provide access to the encryption system 100 over a web interface.

The data store 108 may be used to store transient and permanent data. In one example, the data store 108 may be used by various other elements of the encryption system 100 to store transient and permanent data.

The transmitter 110 is configured to transmit data from the encryption system 100. For example, the transmitter 100 may transmit the data processed by the encryption system 100 to other systems or components configured to receive the data. In one example, the transmitted 100 may format the data to be transmitted in one or more predefined formats so that other systems or components that receive the data understand the data so received.

Figure 2:
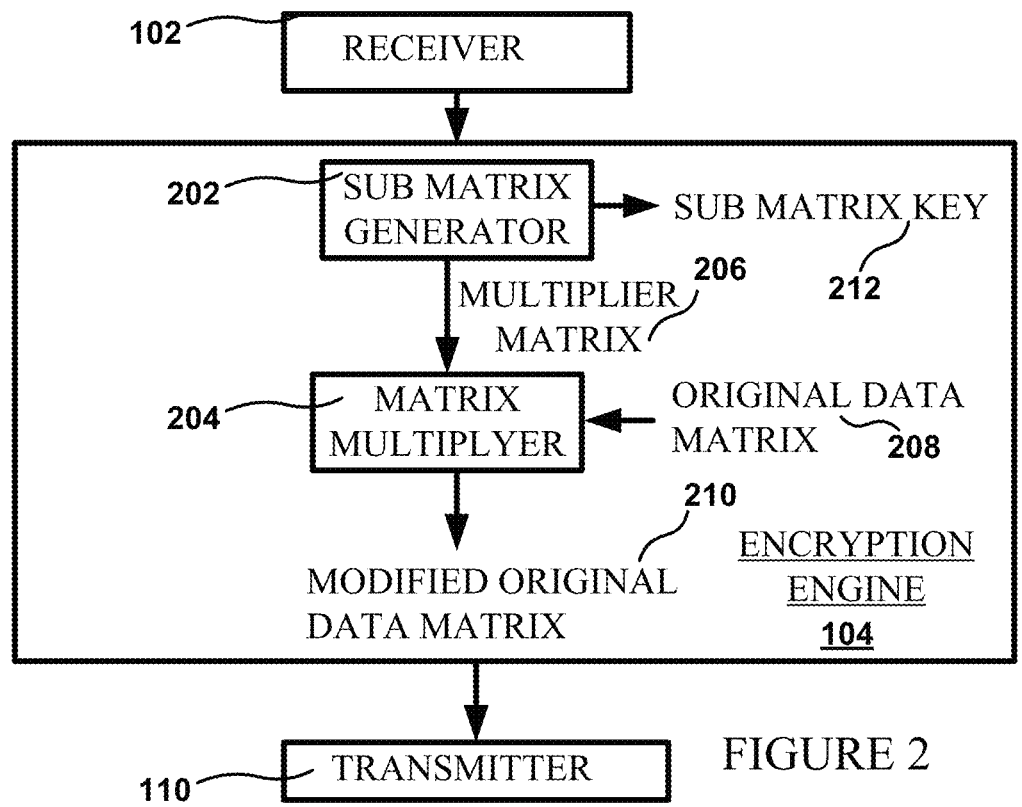
FIG. 2 shows an example encryption engine of the encryption system of FIG. 1, according an aspect of the present disclosure.

Now, referring to FIG. 2, an example encryption engine 104 will be further described. The encryption engine 104 includes a sub matrix generator 202 and a matrix multiplier 204. In one example, the sub matrix generator 202 is configured to generate a plurality of sub matrices. The plurality of sub matrices are selectively arranged to form a multiplier matrix 206. Details of the sub matrices and selective arrangement of the sub matrices to form the multiplier matrix 206 will be described later in detail. In one example, the multiplier matrix 206 may have N×N number of words. In one example, each word may include one or more number of bits. In one example, selective arrangement of the characteristics of the sub matrices may form a sub matrix key 212. In one example, the sub matrix generator 202 generates the sub matrix key 212. In one example, the sub matrix key 212 may be used to generate the multiplier matrix 206, which will be described later.

The matrix multiplier 204 is configured to perform a matrix multiplication of a received data with the multiplier matrix 206. In one example, the received block of data from the receiver 102 may be arranged in the form of a matrix with N×1 number of words. In one example, each word may include one or more number of bits. For convenience, the received block of data arranged in a matrix form will be sometimes referred to as an original data matrix 208.

In one example, the matrix multiplier 204 receives the multiplier matrix 206 and the original data matrix 208 and performs a matrix multiplication of the multiplier matrix and the original data matrix to generate a modified original data matrix 210. In one example, the modified original data matrix 210 will have N×1 number of words.

In one example, the modified original data matrix 210 is representative of the original data matrix 208 in an anonymized form. In one example, if a matrix multiplication of the modified original data 210 is performed with the multiplier matrix 206, the result of the matrix multiplication will generate or reproduce the original data matrix 208. So, in one example, the modified original data matrix 210 may represent the anonymized original data matrix 208.

In one example, the modified original data matrix 210 may be transmitted to a destination computing device by the transmitter 110. The destination computing device may recreate the original data matrix by performing a matrix multiplication of the modified original data matrix 210 with the multiplier matrix 206, for example, using the decryption engine 122.

Figure 2A:
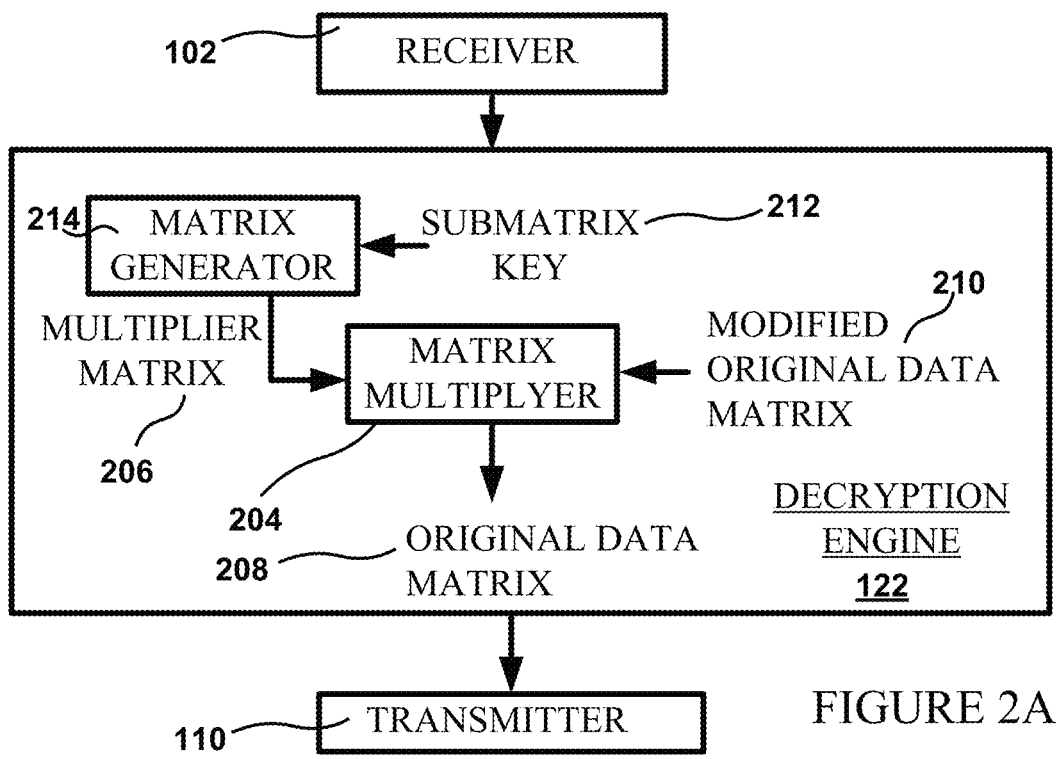
FIG. 2A shows an example decryption engine of the encryption system of FIG. 1, according to an aspect of the present disclosure.

An example decryption engine 122 is described with reference to FIG. 2A. The receiver 102 receives the modified original data matrix 206. The multiplier matrix 204 receives the modified original data matrix 206 and the matrix multiplier 206. In one example, knowing the characteristics of the sub matrices may help in regenerating the multiplier matrix 206. In one example, selective arrangement of the characteristics of the sub matrices may form a sub matrix key 212. In one example, the sub matrix key may be used to generate the multiplier matrix 206. For example, the matrix generator 214 may receive the sub matrix key 212 as input and generate the multiplier matrix 206 as output. The matrix multiplier 204 multiplies the modified original data matrix 210 with the matrix multiplier 206 to generate the original data matrix 208. The original data matrix 208 is transmitted by the transmitter 208 for further processing. In some examples, the sub matrix key 212 may be referred to as an encryption key. These will be further described in detail, using one or more examples.

Figure 3:
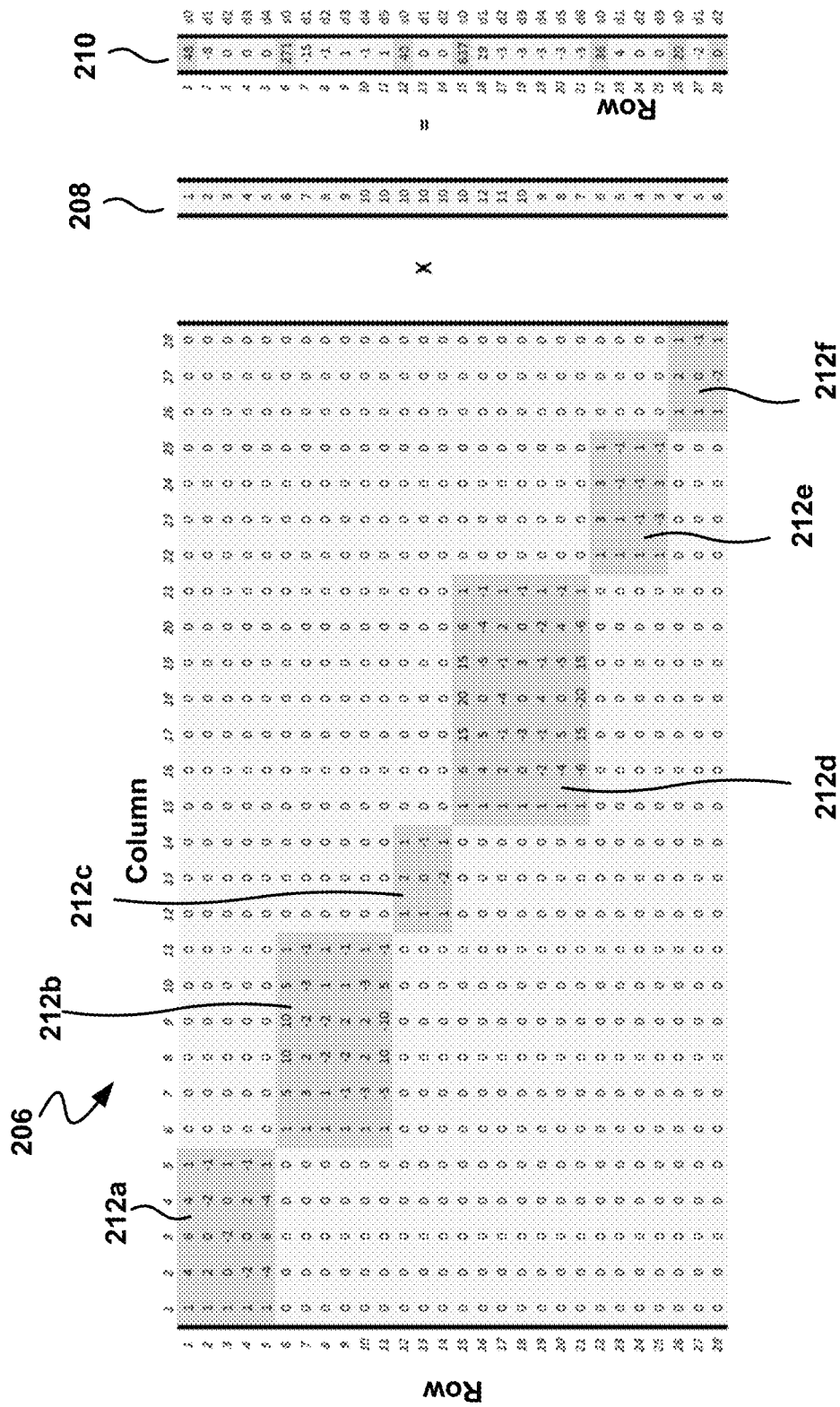
FIG. 3 shows an example multiplier matrix, original data matrix and the modified original data matrix, according to an aspect of the present disclosure.

Now, referring to FIG. 3, an example multiplier matrix 206 is described. In this example, the multiplier matrix 206 is a 28×28 matrix. In other words, 28 rows and 28 columns of data define the multiplier matrix 206. Each element of the multiplier matrix may be referred to as an element E i,j, where, i represents the row number and j represents the column number for the element. As an example, the value of element E 5,4 is −4 and value of E 6,5 is a zero. The multiplier matrix 206 has a plurality of sub matrices arranged diagonally within the 28×28 matrix. In this example, there are six sub matrices, 212a, 212b, 212c, 212d, 212e and 212f. The sub matrices n×n in this example, are arranged as a binomial matrix Bn, with n indicative of number of rows and columns in the binomial matrix. In one example, all elements of the multiplier matrix that is not part of a sub matrix is set to zero.

As one skilled in the art appreciates, a binomial matrix B1 will have a value of {{1}}. A binomial matrix B2 will have a value of {{1,1}, {1,−1}}. A binomial matrix B3 will have a value of {{1,2,1}, {1,0,−1} and {1,−2,1}}. A binomial matrix B4 will have a value of {{1,3,3,1}, {1,1,−1,−1}, {1,−1,−1,1} and {1,−3,3,−1}}. A binomial matrix B5 will have a value of {{1,4,6,4,1}, {1,2,0,−2,−1}, {1,0,−2,0,1}, {1,−2,0,2,−1}, and {1,−4,6,−4,1}}. A binomial matrix B6 will have a value of {{1,5,10,10,5,1},{1,3,2,−2,−3,−1},{1, 2,−2,−2,1,1},{1,−1,02,2,1,−1},{1,−3,3,3,−3,1}, and {1,−5, 10,−10,5,−1}}. A binomial matrix B7 will have a value of {{1,6,15,20,15,6,1},{1,4,5,0,−5,−4,−1},{1,2,−1,−4,−1,2,1}, {1,0,−3,0,3,0,−1},{1,−2,−1,4,−1,−2,1},{1,−4,5,0,−5,4,−1}, and {1,−6,15,−20,15,−6,1}}. A binomial matrix B8 will have a value of {{1,7,21,35,35,21,7,1},{1,5,9,5,−5,−9,−5, −1},{1,3,1,−5,−5,1,3,1},{1,1,−3,−3,3,3,−1,−1},{1,−1,−3,3, 3,−3,1,1},{1,−3,1,5,−5,−1,3,−1},{1,−5,9,−5,−5,9,−5,1}, and {1,−7,21,−35,35,−21,7,−1}}.

Now, referring back to FIG. 3, we notice that the sub matrix 212a is a binomial matrix B5, sub matrix 212b is a binomial matrix B6, sub matrix 212c is a binomial matrix B3, sub matrix 212d is a binomial matrix B7, sub matrix 212e is a binomial matrix B4 and sub matrix 212f is a binomial matrix B3.

FIG. 3 also shows the original data matrix 208. In this example, the original data matrix 208 is a 28×1 matrix. FIG. 3 also shows the modified original data matrix 210, which is derived by performing a matrix multiplication of the multiplier matrix 206 and original data matrix 208. As one skilled in the art appreciates, the modified original data matrix 210 is a 28×1 matrix.

In one example, the size or dimension of the sub matrices 212a, 212b, 212c, 212d, 212e and 212f may be used as an encryption key. In one example, a sequential arrangement of the dimension of the sub matrices may represent an encryption key. In this example, the encryption key will be 563743. In some example, the encryption key may be an obfuscated sequence of the dimension of the sub matrix key. As an example, dimensions of the odd sub matrices may be arranged sequentially, followed by dimensions of the even sub matrices. This may yield an encryption key of 534673.

As one skilled in the art appreciates, various combinations of the dimensions of the sub matrices may be arranged to define an encryption key. Once the encryption key is decoded, the dimensions of the sub matrices are retrieved. Once the dimensions of the sub matrices are retrieved the multiplier matrix may be recreated. As previously described, by performing a matrix multiplication of the multiplier matrix with the modified original data matrix will generate the original data matrix. This will be further described in detail later.

Compression:

Now, referring to FIG. 4, modified original data matrix 210 is shown and further described. Now, observing the modified original data matrix 210, we notice that each sub matrix when multiplied with corresponding portion of the original data matrix 208 generates a scalar coefficient represented as S0 and a plurality of wavelet coefficients represented as d1, d2, d3 and so on. The scalar coefficient S0 is sometimes referred to as a weighted average coefficient. The wavelet coefficients d1, d2, d3 and so on is sometimes referred to as a differential coefficient. For example, the elements E 1,1 to E 5,1 of the modified original data matrix 210 correspond to the sub matrix 212a, elements E 6,1 to E 11,1 correspond to sub matrix 212b, elements E 12,1 to E 14,1 correspond to sub matrix 212c, elements E 15,1 to E 21, 1 correspond to sub matrix 212d, elements E 22,1 to E 25, 1 correspond to sub matrix 212e and elements E 26,1 to E 28,1 correspond to sub matrix 212f. In this example, elements E 1,1, E 6,1, E 12,1, E 15,1, E 22,1 and E 26,1 represent a scalar coefficient or weighted average coefficient. Other elements represent the wavelet coefficients or differential coefficients. For example, elements E 2,1 to E 5,1 represent wavelet coefficient or differential coefficient corresponding to sub matrix 212a. Similarly, elements E 7, 1 to E 11, 1 represent wavelet coefficient or differential coefficient corresponding to sub matrix 212b.

In one example, an aggregate energy for the modified original data matrix 210 is calculated. The aggregate energy is a sum of all of the sub energy for portions of the modified original data matrix 210 that corresponds to a sub matrix. The sub energy for a portion of the modified data matrix 210 that corresponds to a sub matrix is calculated by dividing the sum of the modulus of the differential coefficients by a square of the number of differential coefficients in the sub matrix. For example, column 402 shows various modulus of the differential coefficients.

As an example, the sum of the modulus of the differential coefficients for portion of the modified original data matrix 210 represented by elements E 1,1 to E 5,1 is 8. Number of differential coefficients is 4. The sub energy for this portion of the modified original data matrix 210 is 0.5.

Similarly, the sum of the modulus of the differential coefficients for portion of the modified original data matrix 210 represented by elements E 6,1 to E 11,1 is 19. Number of differential coefficients is 5. The sub energy for this portion of the modified original data matrix 210 is 0.59.

Similarly, the sum of the modulus of the differential coefficients for portion of the modified original data matrix 210 represented by elements E 12,1 to E 14,1 is 0. Number of differential coefficients is 2. The sub energy for this portion of the modified original data matrix 210 is 0.

Similarly, the sum of the modulus of the differential coefficients for portion of the modified original data matrix 210 represented by elements E 15,1 to E 21,1 is 44. Number of differential coefficients is 6. The sub energy for this portion of the modified original data matrix 210 is 0.69.

Similarly, the sum of the modulus of the differential coefficients for portion of the modified original data matrix 210 represented by elements E 22,1 to E 25,1 is 4. Number of differential coefficients is 3. The sub energy for this portion of the modified original data matrix 210 is 0.5.

Similarly, the sum of the modulus of the differential coefficients for portion of the modified original data matrix 210 represented by elements E 26,1 to E 28,1 is 2. Number of differential coefficients is 2. The sub energy for this portion of the modified original data matrix 210 is 0.5.

Now, adding all the calculated sub energies, we get an aggregate energy for the modified original data matrix 210 is 0.5+0.59+0.69+0.5+0.5=2.78. In one example, it may be preferable to selectively change the dimension of the sub matrices of the multiplier matrix to generate a modified original data matrix 210 with minimal amount of aggregate energy. Such a modified original data matrix 210 with minimal amount of aggregate energy may indicate values in the modified original data matrix 210 that may yield a better compression efficiency, if the modified original data matrix 210 is compressed prior to transmission or storage. In one example, when the aggregate energy tends to be lower, the value of a maximum number of elements are zero. Such a matrix with a plurality of element value of zero is conducive for better compression. Another example encryption engine 104a will now be described with reference to FIG. 5.

Figure 5:
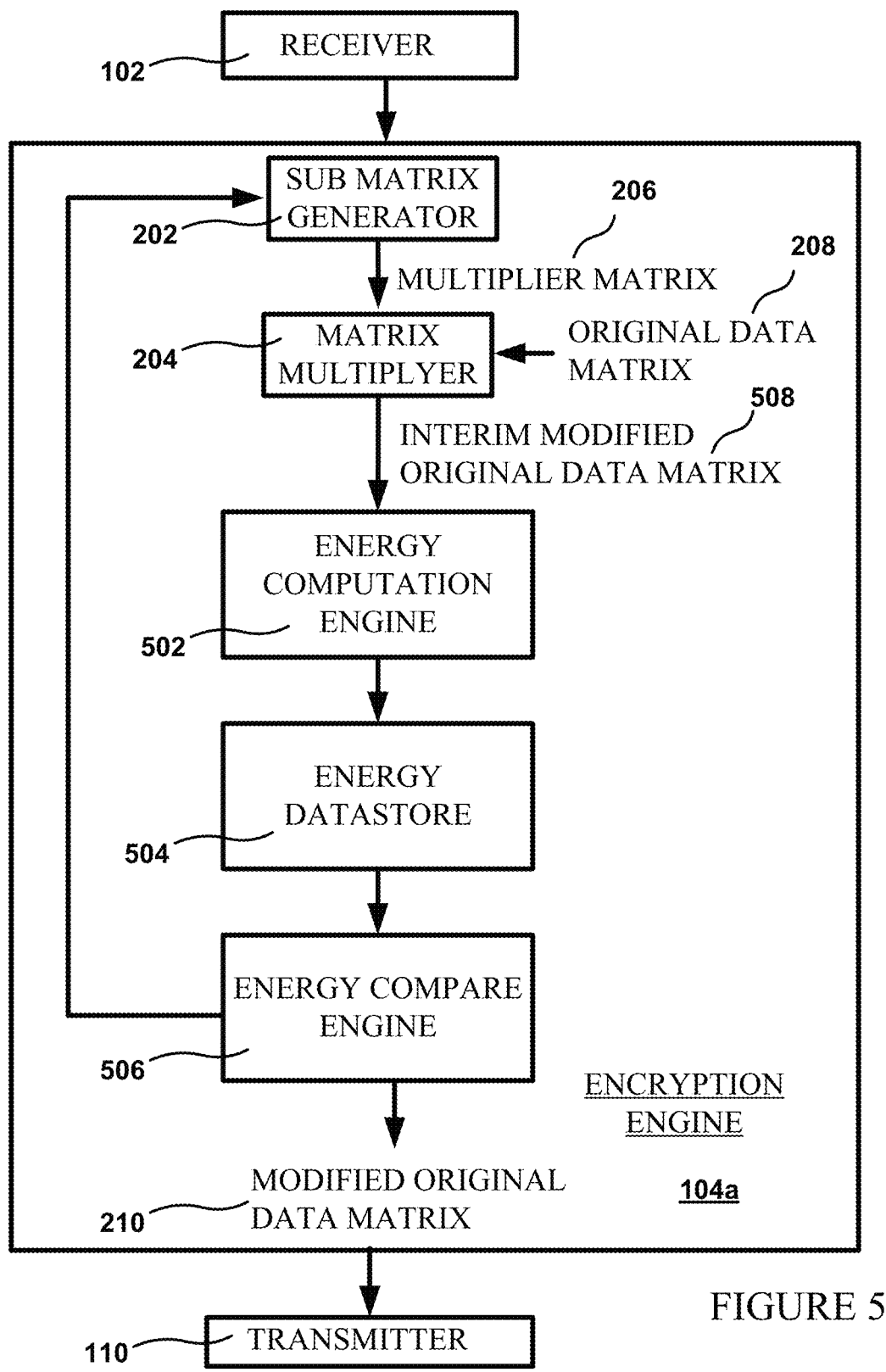
FIG. 5 shows an alternate example encryption engine, according to an aspect of the present disclosure.

Now, referring to FIG. 5, another example encryption engine 104a is described. In some examples, the encryption engine 104a may be similar to encryption engine 104 previously described with reference to FIG. 2 and may be part of the encryption system 100 previously described with reference to FIG. 1.

The encryption engine 104a includes a sub matrix generator 202, a matrix multiplier 204, energy computation engine 502, energy data store 504 and an energy compare engine 506. The sub matrix generator 202 is configured to generate one or more multiplier matrix 206, as previously described with reference to FIG. 2 and FIG. 3. The matrix multiplier 204 is configured to receive the multiplier matrix 206 and original data matrix 208 and perform a matrix multiplication and generate an output matrix, as previously described with reference to FIG. 2 and FIG. 3. In this example, the output matrix is designated as an interim modified original data matrix 508.

In one example, a plurality of interim modified original data matrix 508 may be generated by using a plurality of multiplier matrix 206 generated by the sub matrix generator 202. For example, a plurality of multiplier matrix 206 may be generated by selectively changing the dimensions of the plurality of sub matrices that form the multiplier matrix.

The interim modified original data matrix 508 is similar to the modified original data matrix 210 described with reference to FIG. 2, FIG. 3 and FIG. 4. For example, an aggregate energy for the interim modified original data matrix 508 may be calculated as described with reference to FIG. 4. As an example, the energy computation engine 502 may be configured to calculate the aggregate energy for the interim modified original data matrix 508, as previously described with reference to FIG. 4.

Calculated aggregate energy for a plurality of interim modified original data matrix 508 is stored in the energy data store 504. The energy compare engine compares the aggregate energy for each of the plurality of interim modified original data matrix 508 and selects one of the interim modified original data matrix with minimal amount of aggregate energy. The selected one of the interim modified original data matrix is output as the modified original data matrix 210 in this example. As previously described with reference to FIG. 2 and FIG. 3, the dimensions of the sub matrix corresponding to the multiplier matrix that generated minimal amount of aggregate energy is selectively arranged to form an encryption key for the modified original data matrix 210.

Now, an example of various multiplier matrices, corresponding interim modified original data matrix, corresponding aggregate energy and selection of one of the interim modified original data matrix based on the minimal aggregate energy will now be described by using FIGS. 6, 6A, 7, 7A, 8, 8A, 9, 9A, 10, 10A, 11 and 11A.

Figure 6:
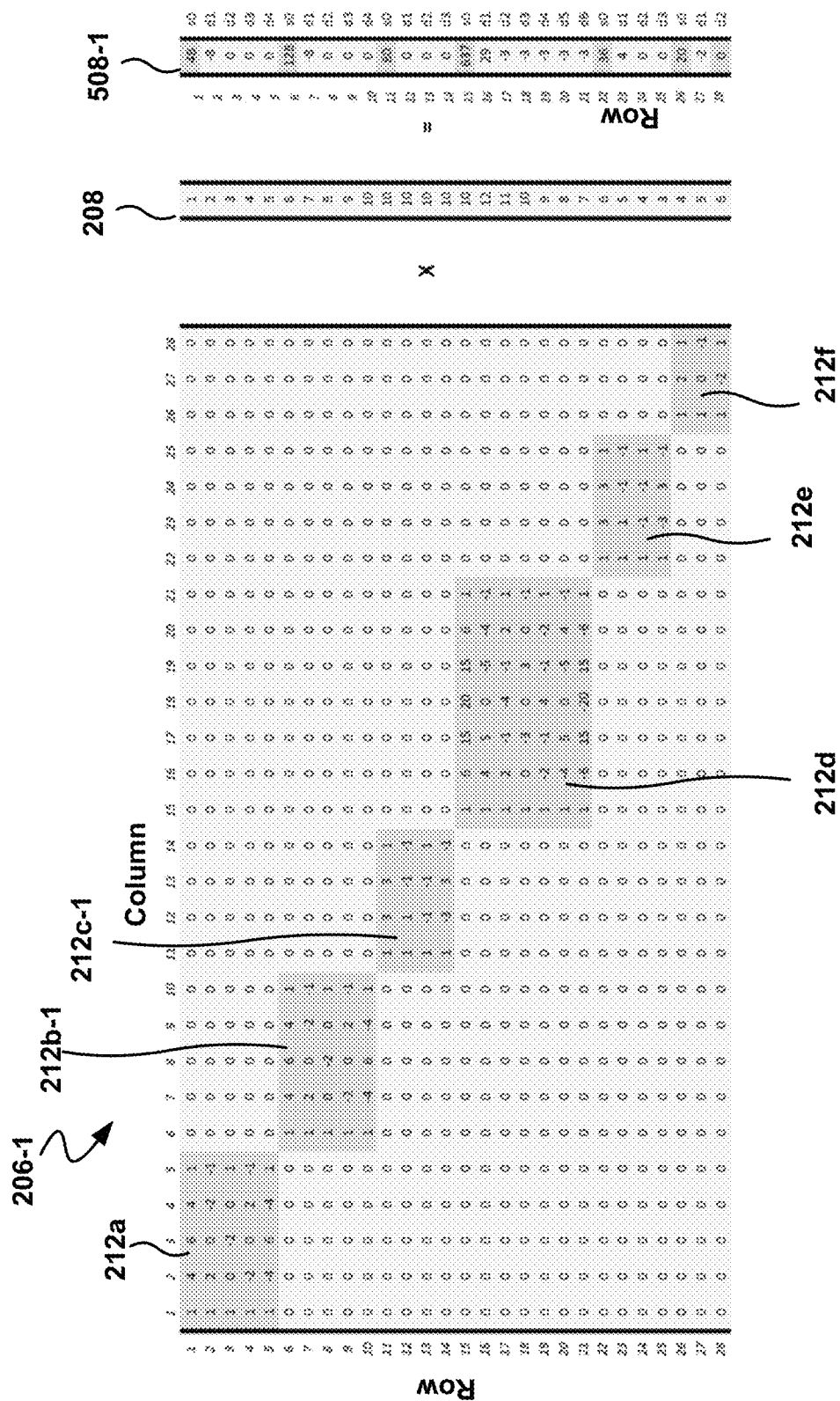
FIGS. 6, 7, 8, 9, 10 and 11 shows alternate examples of multiplier matrix, original data matrix and corresponding interim modified original data matrix, according to an aspect of the present disclosure, according to an aspect of the present disclosure.

Now, referring to FIG. 6, an example multiplier matrix 206-1 is shown. The multiplier matrix 206-1 is similar to multiplier matrix 206 shown in FIG. 3, except that one or more of the sub matrix dimensions are different. In this example, the sub matrix 212b-1 has a dimension of 5×5 and the sub matrix 212C-1 has a dimension of 4×4. The multiplier matrix 206-1 is matrix multiplied with the original data matrix 208 to generate an interim modified original data matrix 508-1. FIG. 6A shows various weighted average coefficients and differential coefficients of the interim modified original data matrix 508-1 and the corresponding aggregate energy of the interim modified original data matrix 508-1. In this example, the aggregate energy of the interim modified original data matrix 508-1 is 2.69. Further, number of zeros in the interim modified original data matrix 508-1 is 12.

Figure 7:
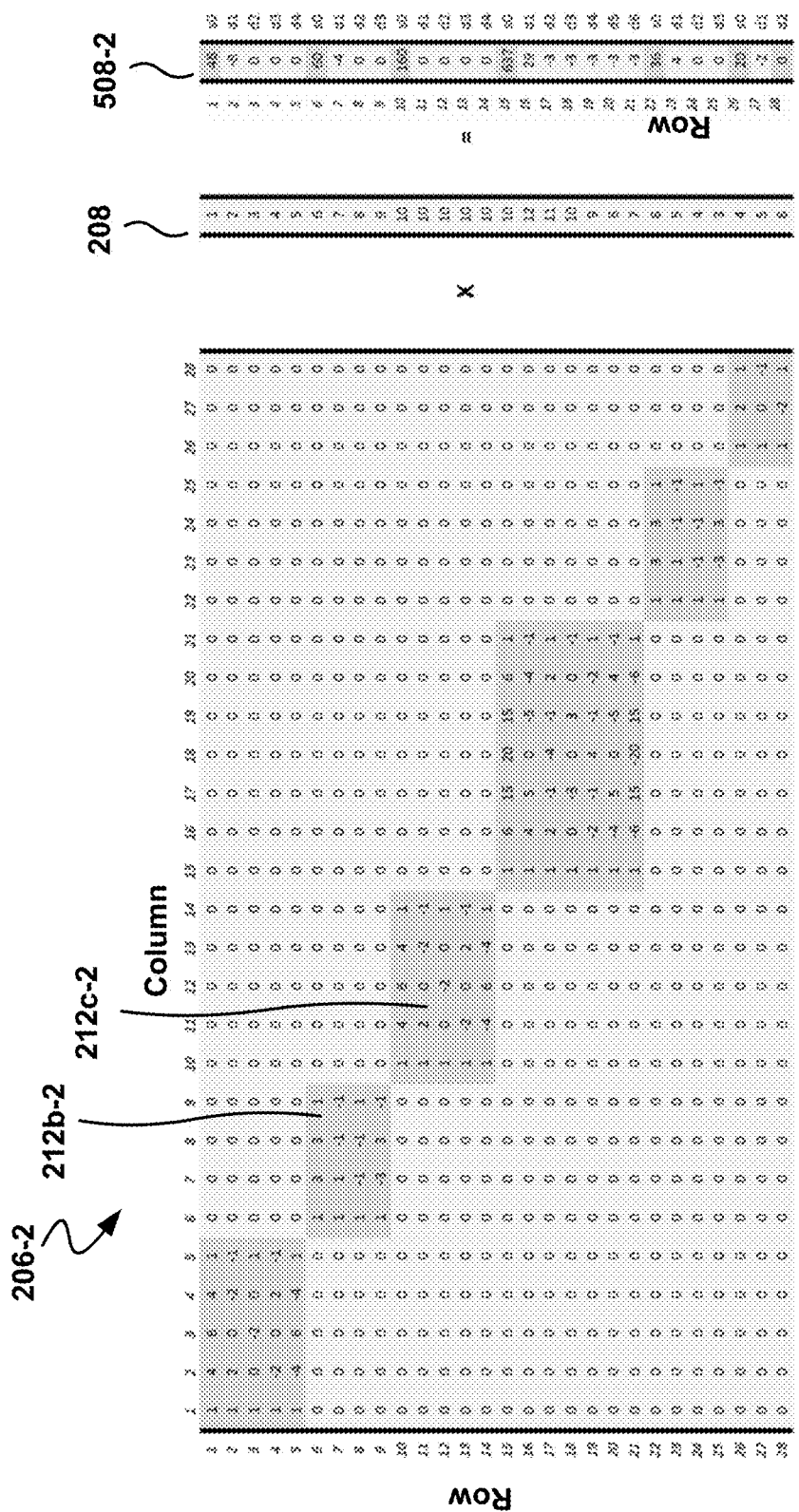

Now, referring to FIG. 7, another example multiplier matrix 206-2 is shown. The multiplier matrix 206-2 is similar to multiplier matrix 206 shown in FIG. 3, except that one or more of the sub matrix dimensions are different. In this example, the sub matrix 212b-2 has a dimension of 4×4 and the sub matrix 212C-2 has a dimension of 5×5. The multiplier matrix 206-2 is matrix multiplied with the original data matrix 208 to generate an interim modified original data matrix 508-2. FIG. 7A shows various weighted average coefficients and differential coefficients of the interim modified original data matrix 508-2 and the corresponding aggregate energy of the interim modified original data matrix 508-2. In this example, the aggregate energy of the interim modified original data matrix 508-2 is 2.69. Further, number of zeros in the interim modified original data matrix 508-2 is 12.

Figure 8:
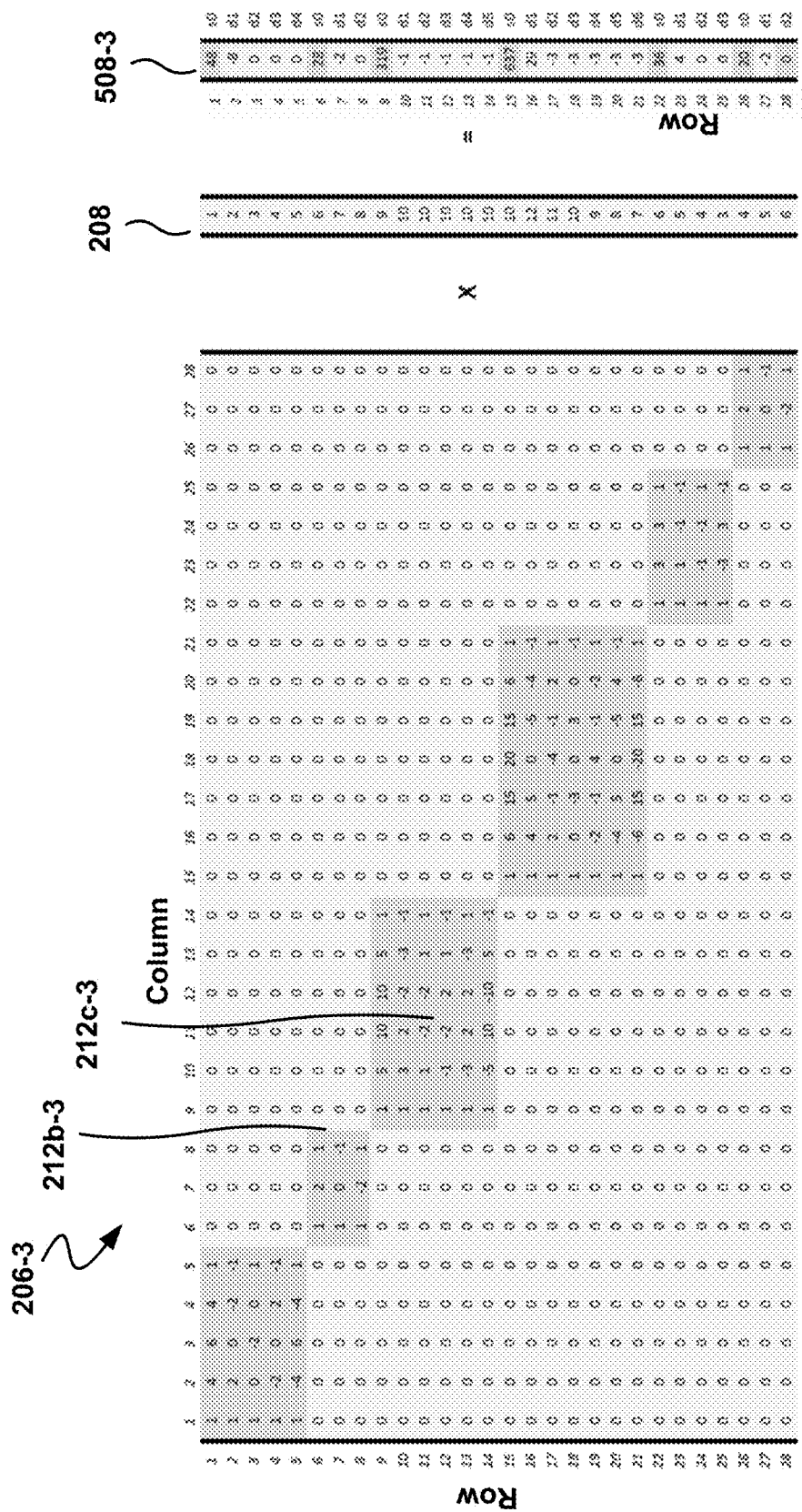

Now, referring to FIG. 8, another example multiplier matrix 206-3 is shown. The multiplier matrix 206-3 is similar to multiplier matrix 206 shown in FIG. 3, except that one or more of the sub matrix dimensions are different. In this example, the sub matrix 212b-3 has a dimension of 3×3 and the sub matrix 212C-3 has a dimension of 6×6. The multiplier matrix 206-3 is matrix multiplied with the original data matrix 208 to generate an interim modified original data matrix 508-3. FIG. 8A shows various weighted average coefficients and differential coefficients of the interim modified original data matrix 508-3 and the corresponding aggregate energy of the interim modified original data matrix 508-3. In this example, the aggregate energy of the interim modified original data matrix 508-3 is 2.84. Further, number of zeros in the interim modified original data matrix 508-3 is 7.

Figure 9:
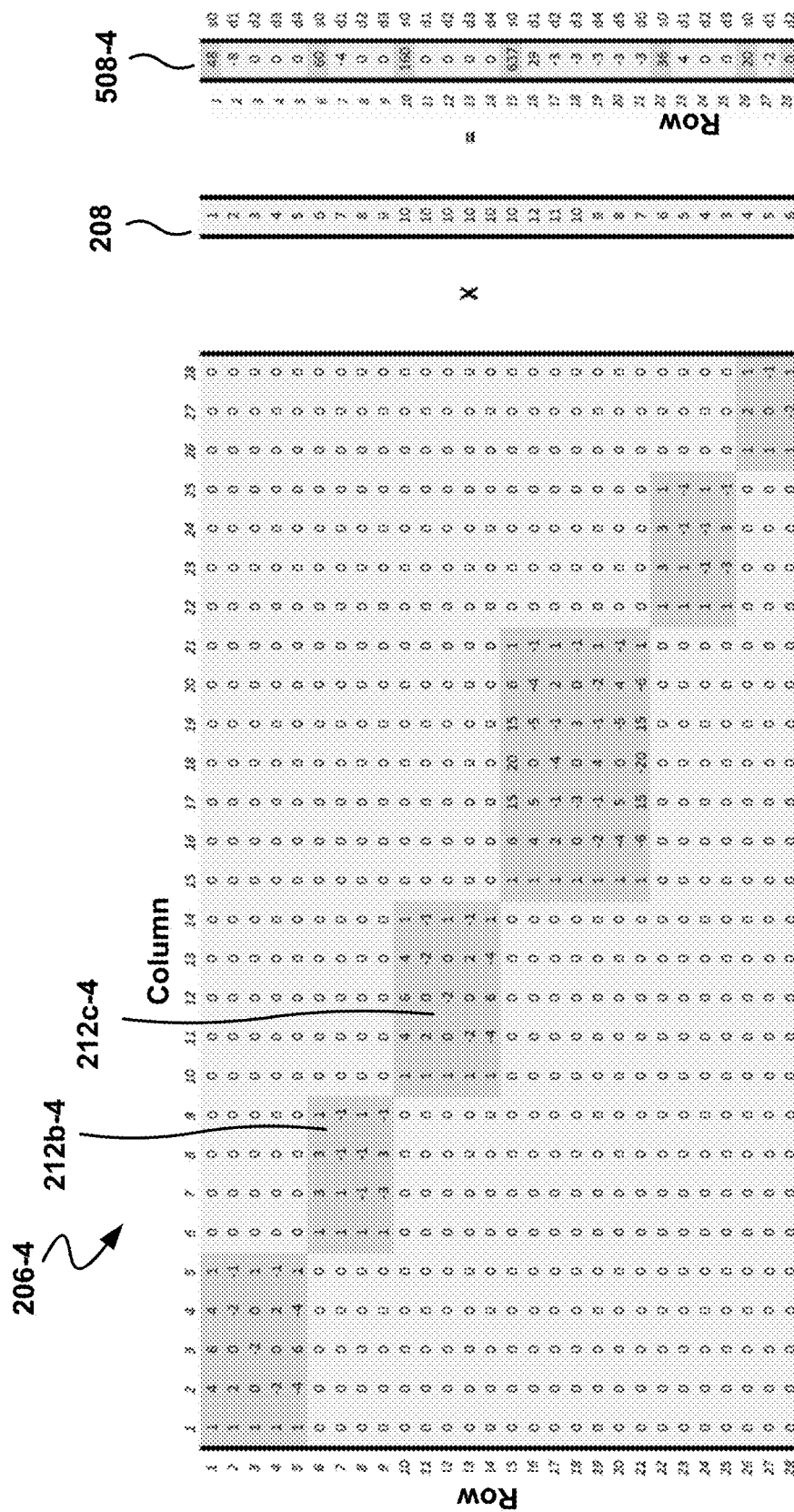

Now, referring to FIG. 9, yet another example multiplier matrix 206-4 is shown. The multiplier matrix 206-4 is similar to multiplier matrix 206 shown in FIG. 3, except that one or more of the sub matrix dimensions are different. In this example, the sub matrix 212b-4 has a dimension of 4×4 and the sub matrix 212C-4 has a dimension of 5×5. The multiplier matrix 206-4 is matrix multiplied with the original data matrix 208 to generate an interim modified original data matrix 508-4. FIG. 9A shows various weighted average coefficients and differential coefficients of the interim modified original data matrix 508-4 and the corresponding aggregate energy of the interim modified original data matrix 508-4. In this example, the aggregate energy of the interim modified original data matrix 508-4 is 2.69. Further, number of zeros in the interim modified original data matrix 508-4 is 12.

Figure 10:
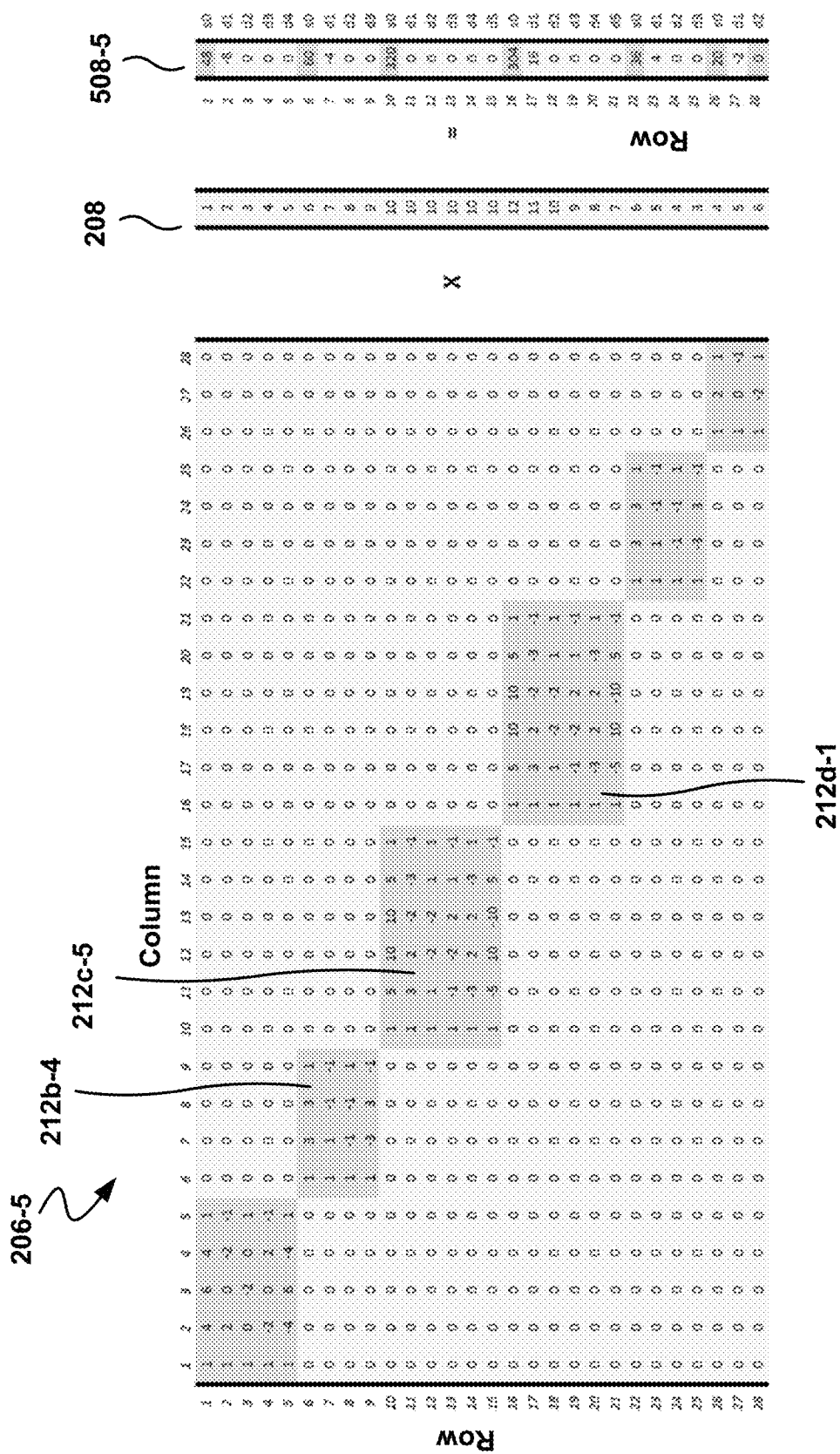

Now, referring to FIG. 10, yet another example multiplier matrix 206-5 is shown. The multiplier matrix 206-5 is similar to multiplier matrix 206 shown in FIG. 3, except that one or more of the sub matrix dimensions are different. In this example, the sub matrix 212b-4 has a dimension of 4×4, the sub matrix 212C-5 has a dimension of 6×6 and the sub matrix 212d-1 has a dimension of 6×6. The multiplier matrix 206-5 is matrix multiplied with the original data matrix 208 to generate an interim modified original data matrix 508-5. FIG. 10A shows various weighted average coefficients and differential coefficients of the interim modified original data matrix 508-5 and the corresponding aggregate energy of the interim modified original data matrix 508-5. In this example, the aggregate energy of the interim modified original data matrix 508-5 is 2.5. Further, number of zeros in the interim modified original data matrix 508-1 is 17.

Figure 11:
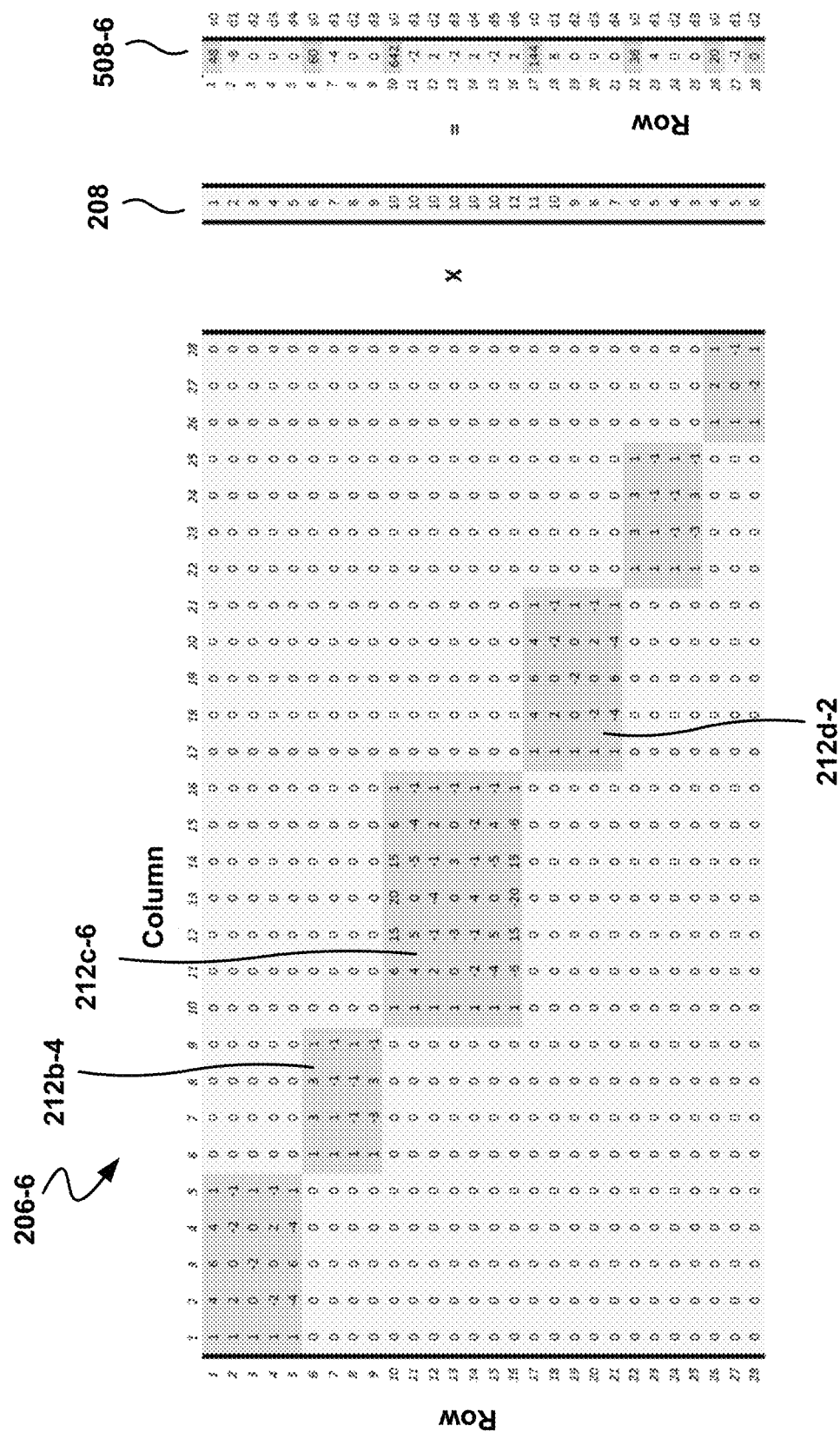

Now, referring to FIG. 11, yet another example multiplier matrix 206-6 is shown. The multiplier matrix 206-6 is similar to multiplier matrix 206 shown in FIG. 3, except that one or more of the sub matrix dimensions are different. In this example, the sub matrix 212b-4 has a dimension of 4×4, the sub matrix 212C-6 has a dimension of 7×7 and the sub matrix 212d-2 has a dimension of 5×5. The multiplier matrix 206-6 is matrix multiplied with the original data matrix 208 to generate an interim modified original data matrix 508-6. FIG. 11A shows various weighted average coefficients and differential coefficients of the interim modified original data matrix 508-6 and the corresponding aggregate energy of the interim modified original data matrix 508-6. In this example, the aggregate energy of the interim modified original data matrix 508-6 is 2.69. Further, number of zeros in the interim modified original data matrix 508-1 is 11.

In one example, various computed aggregate energy is stored in the energy data store. The energy compare engine compares various computed aggregate energy and selects the interim modified original data matrix with least amount of aggregate energy as the modified original data matrix. In this example, the interim modified original data matrix 508-5 is selected as the modified original data matrix 210, based on the aggregate energy of 2.5, as described with reference to FIGS. 10 and 10A. Further, we notice that the interim modified original data matrix 508-5 has 17 zeros, which is more desirable for compression than interim modified original data matrices 508-1, 508-2, 508-3, 508-4 and 508-6. The dimensions of the sub matrix for the multiplier matrix 206-5 is selectively ordered to generate a corresponding encryption key for the modified original data matrix, as previously described with reference to FIG. 3. In this example, the sequential order of the dimensions of the multiplier matrix 206-5 is 5, 4, 6, 6, 4 and 3.

Decryption

Figure 12:
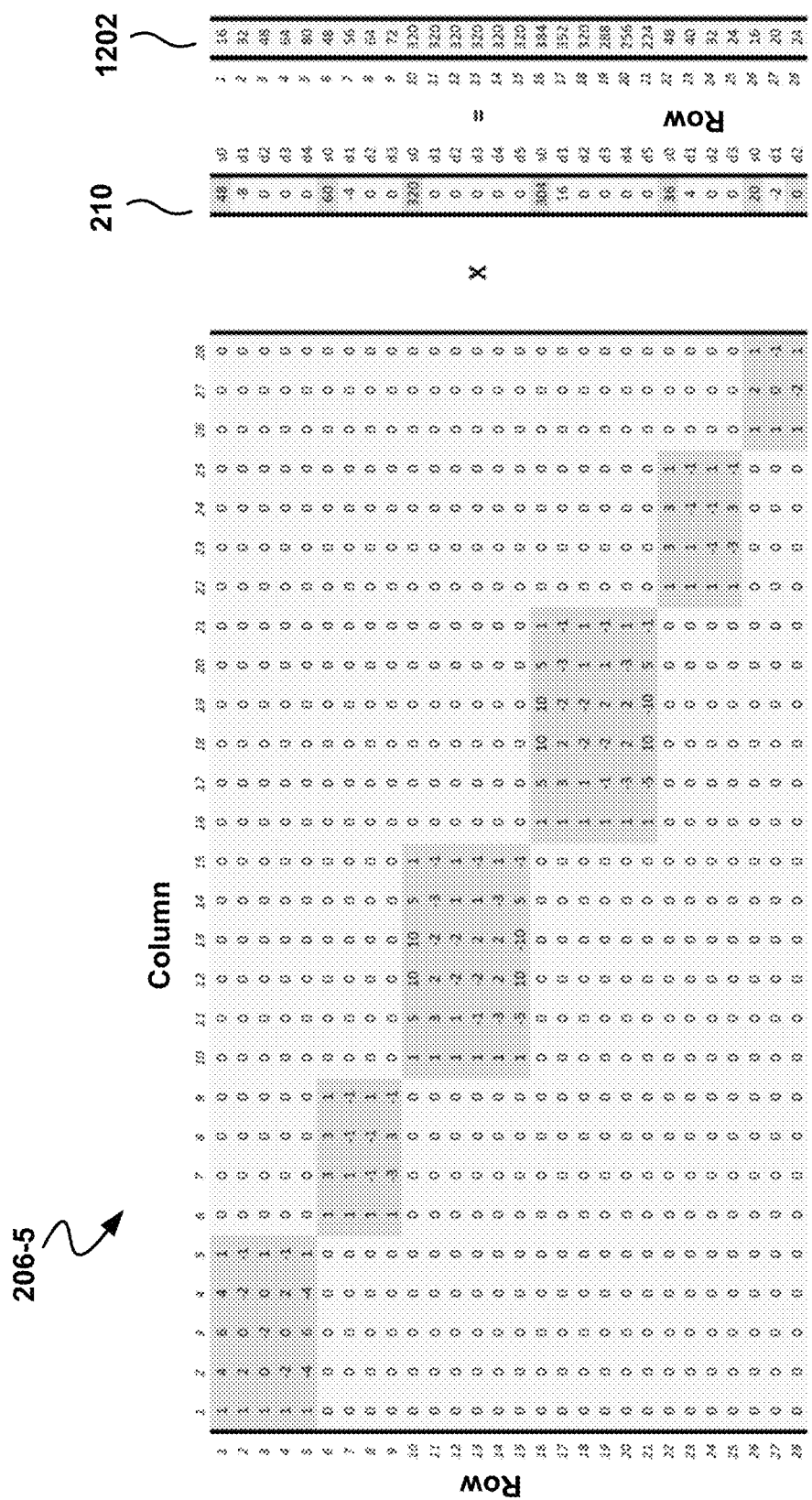
FIG. 12 shows another example multiplier matrix, modified original data matrix and corresponding interim original data matrix, according to an aspect of the present disclosure.

Now, referring to FIGS. 12 and 12A, an example decryption of the modified original data matrix of FIG. 10 will be described. In this example, the modified original data matrix 210 corresponds to the interim modified original data matrix 508-5. As previously described, the encryption key will provide the dimensions of the sub matrices used to generate the multiplier matrix. In this example, the sequential order of the dimensions of the multiplier matrix 206-5 is 5, 4, 6, 6, 4 and 3. Based on this information, the multiplier matrix 206-5 will be regenerated, as shown in FIG. 12. The multiplier matrix 206-5 is matrix multiplied with modified original data matrix 210 to generate an interim original data matrix 1202.

In one example, the interim original data matrix 1202 has weighted average coefficient and differential coefficient components that are scaled by $2^{(N-1)}$ where N is the corresponding dimension of the sub matrices. In order to retrieve the original data matrix 208 from the interim original data matrix 1202, each of the weighted average coefficients and the differential coefficients have to be divided by $2^{(N-1)}$, where N is the corresponding square of the corresponding dimension of the sub matrices.

For example, elements E 1,1 to E 5,1 are divided by $2^{(N-1)}$, where N is equal to 5, in other words, by $2^{(5-1)}=2^4=16$. Similarly, elements E 6,1 to E 9,1 are divided by $2^{(N-1)}$, where N is equal to 4, in other words, by $2^{(4-1)}=2^3=8$. And, elements E 10,1 to E 15,1 are divided by $2^{(N-1)}$, where N is equal to 5, in other words, by $2^{(6-1)}=2^5=32$. Elements E 16,1 to E 21,1 are divided by $2^{(N-1)}$, where N is equal to 5, in other words, by $2^{(6-1)}=2^5=32$. Elements E 22-1 to E 25,1 are divided by $2^{(N-1)}$, where N is equal to 4, in other words, by $2^{(4-1)}=2^3=8$. And, elements E 26-1 to E 28-1 are divided by $2^{(N-1)}$, where N is equal to 3, in other words, by $2^{(3-1)}=2^2=4$. Selective division of the weighted average coefficients and differential coefficients will generate the original data matrix 208.

Binomial Matrix Transform Processor:

Now, an example binomial matrix transform processor is described, which can be configured to perform various matrix multiplication described herein, in an efficient way. For example, the binomial matrix transform processor may be part of the encryption engine 104 as previously described with reference to FIG. 2 and decryption engine 122 as previously described with reference to FIG. 2A. In some examples, the binomial matrix transform processor may be part of the matrix multiplier 204 of the encryption engine 104. In some examples, the binomial matrix transform processor may be part of the matrix multiplier 204 of the decryption engine 122. In one example, each submatrix is represented as a product of a plurality of lower factorized matrix, a plurality of upper factorized matrix and a shift matrix.

Now, referring to FIG. 13, submatrix 212e (as previously described in FIG. 3) is shown, which is a binomial matrix of the type B4, a 4×4 matrix. FIG. 13 also shows a plurality of upper factorized matrix U1 1301, U2 1302, and U3 1303. FIG. 13 further shows a plurality of lower factorized matrix L1 1321, L2 1322, and L3 1323. A shift matrix S4 1330 is also shown.

Upper factorized matrix are factorized matrix in the sense, the diagonal of the matrix is set to 1. Further, an upper factorized matrix has one or more of the upper diagonal elements set to 1. Let us refer to each element of an upper factorized matrix as Ux (i,j), where i represents the row number and j represents the column number for the element. For upper factorized matrix U1, U2, and U3 elements (1,2), (2,3), and (3,4) are referred to as upper diagonal elements. Now, referring to upper factorized matrix U1 1301, we notice that elements U1 (1,2), U1 (2,3), and U1 (3,4) are all set to 1. Similarly, for upper factorized matrix U2 1302, we notice that elements U1 (1,2), and U1 (2,3) are all set to 1. And, for upper factorized matrix U3 1303, we notice that element U1 (1,2) is set to 1.

Lower factorized matrix are factorized matrix in the sense, the diagonal of the matrix is set to 1. Further, a lower factorized matrix has one or more of the lower diagonal elements set to 1. Let us refer to each element of a lower factorized matrix as Lx (i,j), where i represents the row number and j represents the column number for the element. For lower factorized matrix L1 1321, L2 1322, and L3 1323, elements (2,1), (3,2), and (4,3) are referred to as lower diagonal elements. Now, referring to lower factorized matrix L1 1321, we notice that elements L1 (2,1), L1 (3,2), and L1 (4,3) are all set to 1. Similarly, for lower factorized matrix L2 1322, we notice that elements L1 (3,2), and L1 (4,3) are all set to 1. And, for lower factorized matrix L3 1303, we notice that element L1 (4,3) is set to 1.

Now referring to shift matrix S4 1330, we notice that the diagonal element values are set by the formula $(-2)^n$ where n=0–N. In other words, for shift matrix S4 which is a 4×4 matrix, there are four diagonal elements, with diagonal element values of 1, −2, 4, and −8. Let us refer to each element of a shift matrix as Sx (i,j), where i represents the row number and j represents the column number for the element. Now, referring to shift matrix S4 1330, we notice that elements S4 (1,1), S4 (2,2), S4 (3,3), and S4 (4,4) which correspond to the diagonal elements are set to 1, −2, 4, 8 respectively. All other elements are set to zero. In summary, the shift matrix S4 1330 elements are {{1, 0, 0,0}, {0,−2, 0,0}, {0,0,4,0}, {0,0,0,−8}}.

A binomial submatrix may be represented as a product of a plurality of lower factorized matrix with shift matrix and a plurality of upper factorized matrix. For example, the binomial submatrix of the type B4 may be represented as a product as follows:

$$B4=L3*L2*L1*D4*U3*U2*U1 \quad \text{Equation 1.}$$

Now, binomial matrix B4 212e when multiplied by an input matrix IP4 1332 with a value of {{a}, {b}, {c}, {d}} yields a resulting output matrix OP4 1333 with a value of {{a+3b+3c+d}, {a+b−c−d}, {a−b−c+d}, {a−3b+3c−d}}

Same result can be achieved by a product of a plurality of lower factorized matrix with shift matrix and a plurality of upper factorized matrix, as described below. Now, referring back to FIG. 13, multiplying upper diagonal matrix U1 1301 by the input matrix IP4 1332 yields a first partial product matrix PP1 1334 with a value of {{a+b}, {b+c}, {c+d}, {d}}. Next, upper diagonal matrix U2 1302 is multiplied by the first partial product matrix PP1 1334 which yields second partial product matrix PP2 1336 with a value of {{a+2b+c}, {b+2c+d}, {c+d}, {d}}. Next, upper diagonal matrix U3 1304 is multiplied by the second partial product matrix PP2 1336 which yields third partial product matrix PP3 1338 with a value of {{a+3b+3c+d}, {b+2c+d}, {c+d}, {d}}. In some examples, the third partial product matrix PP3 1338 may be referred to as a first interim product.

Next, shift matrix S4 1330 is multiplied by the third partial product matrix PP3 1338 which yields fourth partial product matrix PP4 1340 with a value of {{a+3b+3c+d}, {−2(b+2c+d)}, {4(c+d)}, {−8d}}. In some examples, the fourth partial product matrix PP4 1340 may be referred to as a second interim product.

Next, lower diagonal matrix L1 1321 is multiplied by the fourth partial product matrix PP4 1340 which yields fifth partial product matrix PP5 1342 with a value of {{a+3b+3c+d}, {a+b−c−d}, {−2b+2d}, {4c−4d}}. Next, lower diagonal matrix L2 1322 is multiplied by the fifth partial product matrix PP5 1342 which yields sixth partial product matrix PP6 1344 with a value of {{a+3b+3c+d}, {a+c−c+d}, {a−b−c+d}, {a−3b+3c−d}}. Next, lower diagonal matrix L3 1323 is multiplied by the sixth partial product matrix PP6 1344 which yields output matrix OP4 1333 of {{a+3b+3c+d}, {a+b−c−d}, {a−b−c+d}, {a−3b+3c−d}}. In some examples, the output matrix OP4 1333 may be referred to as a third interim product.

When we observe various partial products generated during the matrix multiplication process described above, we notice that various multiplications are either a selective addition of some of the elements of the input matrix and partial product matrix or a selective multiplication by a factor of 2. As one skilled in the art appreciates, selective addition may be accomplished by use of adder circuits. Selective multiplication by a factor of 2 required with the shift matrix may be accomplished by use of a shift circuit. An inverter circuit may be advantageously added to the shift circuit to selective switch the polarity of the output as needed.

Figure 14:
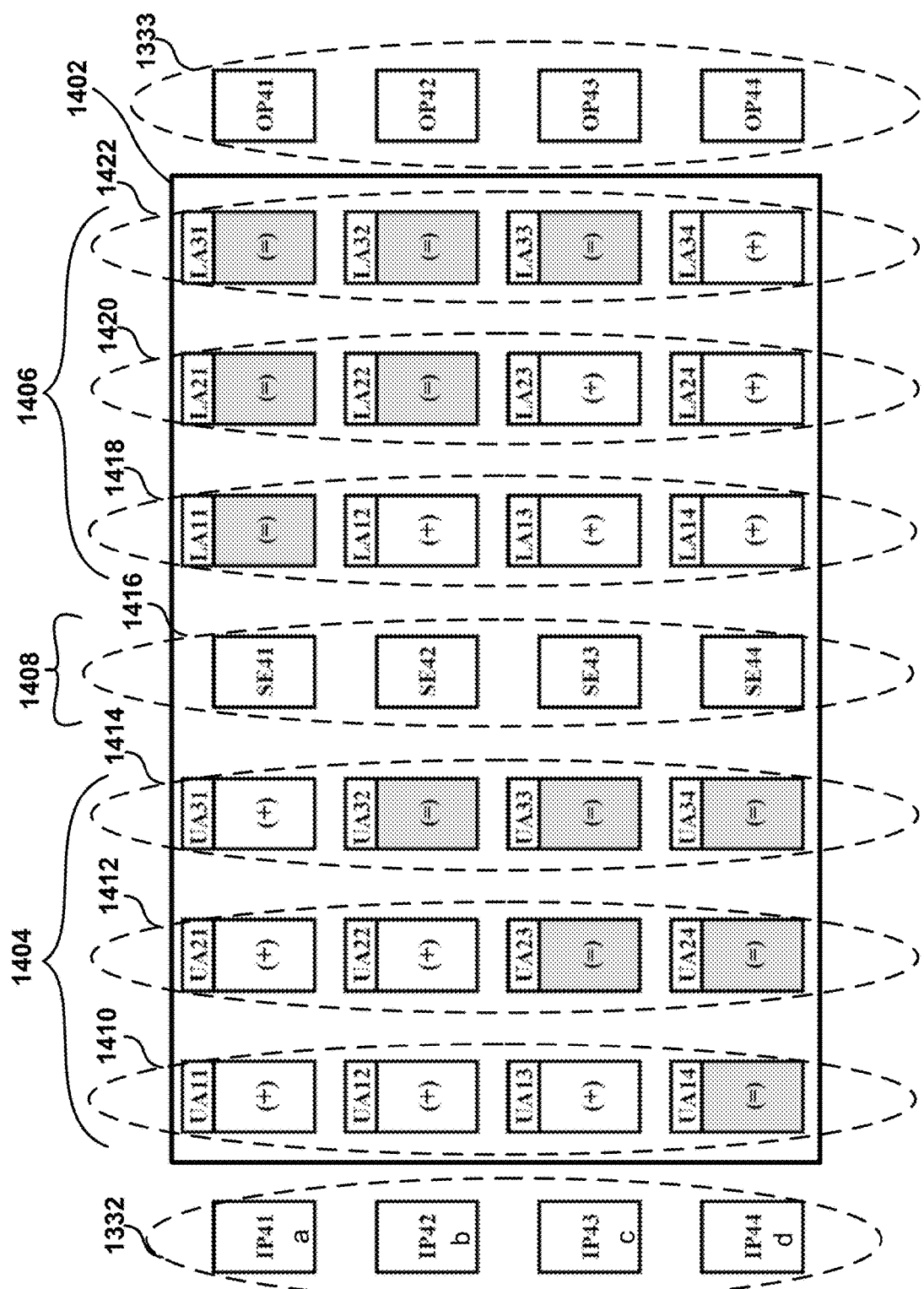
FIG. 14 shows an example binomial matrix processor, according to an aspect of the present disclosure.

Now, referring to FIG. 14, an example binomial matrix processor 1402 configured to perform the multiplication of input matrix IP4 1332 with a binomial matrix B4, using a plurality of lower factorized matrix, a shift matrix and a plurality of upper factorized matrix, as described above.

The binomial matrix processor 1402 has a plurality of upper adder engines 1404, a plurality of lower adder engines 1406 and a plurality of shift engine 1408. The plurality of upper adder engines 1404 are selectively configured to output partial products PP1 1334, PP2 1336 and PP3 1338 when each of the upper diagonal matrix are selectively multiplied with either the input matrix IP4 1332 or one or more of the partial products as previously described with reference to FIG. 13.

The plurality of shift engine 1408 is selectively multiplied with partial product PP3 1338 to output partial product PP4 1340. The plurality of lower adder engines 1406 are selectively configured to output partial products PP5 1342, PP6 1344 and final output OP4 1333 when each of the lower diagonal matrix are selectively multiplied with one or more of the partial products as previously described with reference to FIG. 13.

For example, the input matrix IP4 1332 has elements {{IP41, IP42, IP43, IP44}} which in this example is {{a}, {b}, {c}, {d}} respectively. The first bank of adder engines 1410 include a plurality of adder engines UA11, UA12, UA 13, and UA14. These are selectively configured to provide first partial product PP1, when the input matrix IP4 1332 is multiplied with upper factorized matrix U1 1301. The elements of first partial product PP1 1334 is {{a+b}, {b+c}, {c+d}, {d}}. In other words, the adder engine UA11 is configured to add IP41 with a value of "a" with IP42 with a value of "b" to provide a result of "a+b". Similarly, the adder engine UA12 is configured to add IP42 with a value of "b" with IP43 with a value of "c" to provide a result of "b+c". And, the adder engine UA13 is configured to add IP43 with a value of "c" with IP44 with a value of "d" to provide a result of "c+d". And, finally, the adder engine UA14 is configured as a pass through to pass the value of IP44, without any addition, to provide a result of "d". The output of the first bank of adder engines 1401 corresponds to the first partial product PP1 1334, with elements {{a+b}, {b+c}, {c+d}, {d}}. In other words, various adder engines of the first bank of adder engines 1410 are selectively configured as either an adder or a pass through so as to provide the first partial product PP1 1334 when the input matrix IP4 1332 is multiplied with upper factorized matrix U1 1301.

Similarly, the second bank of adder engines 1412 includes a plurality of adder engines UA21, UA22, UA 23, and UA14. These adder engines are selectively configured to be as either as an adder or a pass through so as to provide the second partial product PP2 1336 when the first partial product PP1 1334 is multiplied with upper factorized matrix U2 1302.

Similarly, the third bank of adder engines 1414 includes a plurality of adder engines UA31, UA32, UA 33, and UA34. These adder engines are selectively configured to be as either as an adder or a pass through so as to provide the third partial product PP3 1338 when the second partial product PP2 1336 is multiplied with upper factorized matrix U3 1303.

Next, the third partial product PP3 is processed by a first bank of shift engines 1416. The first bank of shift engines 1416 include a plurality of shift engines SE41, SE42, SE43, and SE44. Each of the shift engines is selectively configured to multiply by 1, −2, 4, and −8 respectively, as previously described. As one skilled in the art appreciates, a binary multiplication can be accomplished by using a shift register. And, polarity can be changed by using an inverter. In this example, the shift engine SE41 is configured to multiply by 1. In other word, just a pass through. The shift engine SE42 is configured to shift by one bit position, with a polarity change. The shift engine SE43 is configured to shift by two bit positions, with no polarity change. And, finally, shift engine SE44 is configured to shift by three bit positions, with a polarity change. Selective configuration of the shift engines of the first shift engine bank 1416 will provide the fourth partial product PP4 1340 when the third partial product PP3 1338 is multiplied with shift matrix S4 1330.

Now, the fourth bank of adder engines 1418 includes a plurality of adder engines LA11, LA12, LA 13, and LA14. These adder engines are selectively configured to be as either as an adder or a pass through so as to provide the fifth partial product PP5 1342 when the fourth partial product PP4 1340 is multiplied with lower factorized matrix L1 1321.

Similarly, the fifth bank of adder engines 1420 includes a plurality of adder engines LA21, LA22, LA23, and LA24. These adder engines are selectively configured to be as either as an adder or a pass through so as to provide the sixth partial product PP6 1344 when the fifth partial product PP5 1342 is multiplied with lower factorized matrix L2 1322.

Finally, the sixth bank of adder engines 1422 includes a plurality of adder engines LA31, LA32, LA33, and LA34. These adder engines are selectively configured to be as either as an adder or a pass through so as to provide the output matrix OP4 1333 when the sixth partial product PP6 1344 is multiplied with lower factorized matrix L3 1323. The output matrix OP4 1333 has elements {{OP41, OP42, OP43, OP44}} which in this example will be {{a+3b+3c+d}, {a+b−c−d}, {a−b−c+d}, {a−3b+3c−d}} respectively.

Figure 14A:
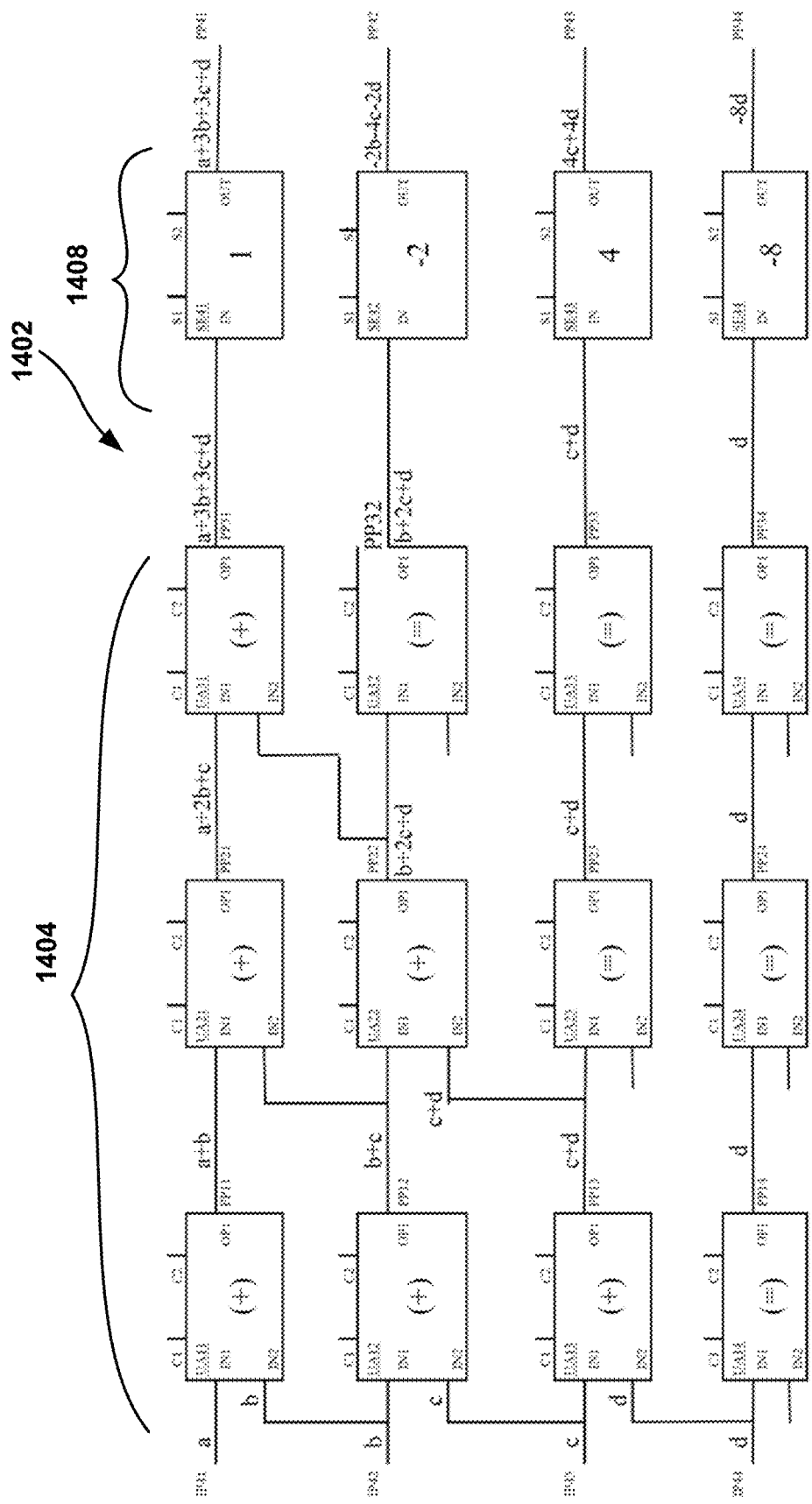
FIG. 14A shows a plurality of upper adder engines and a plurality of shift engines of the binomial matrix processor of FIG. 14, according to an aspect of the present disclosure.
Figure 14B:
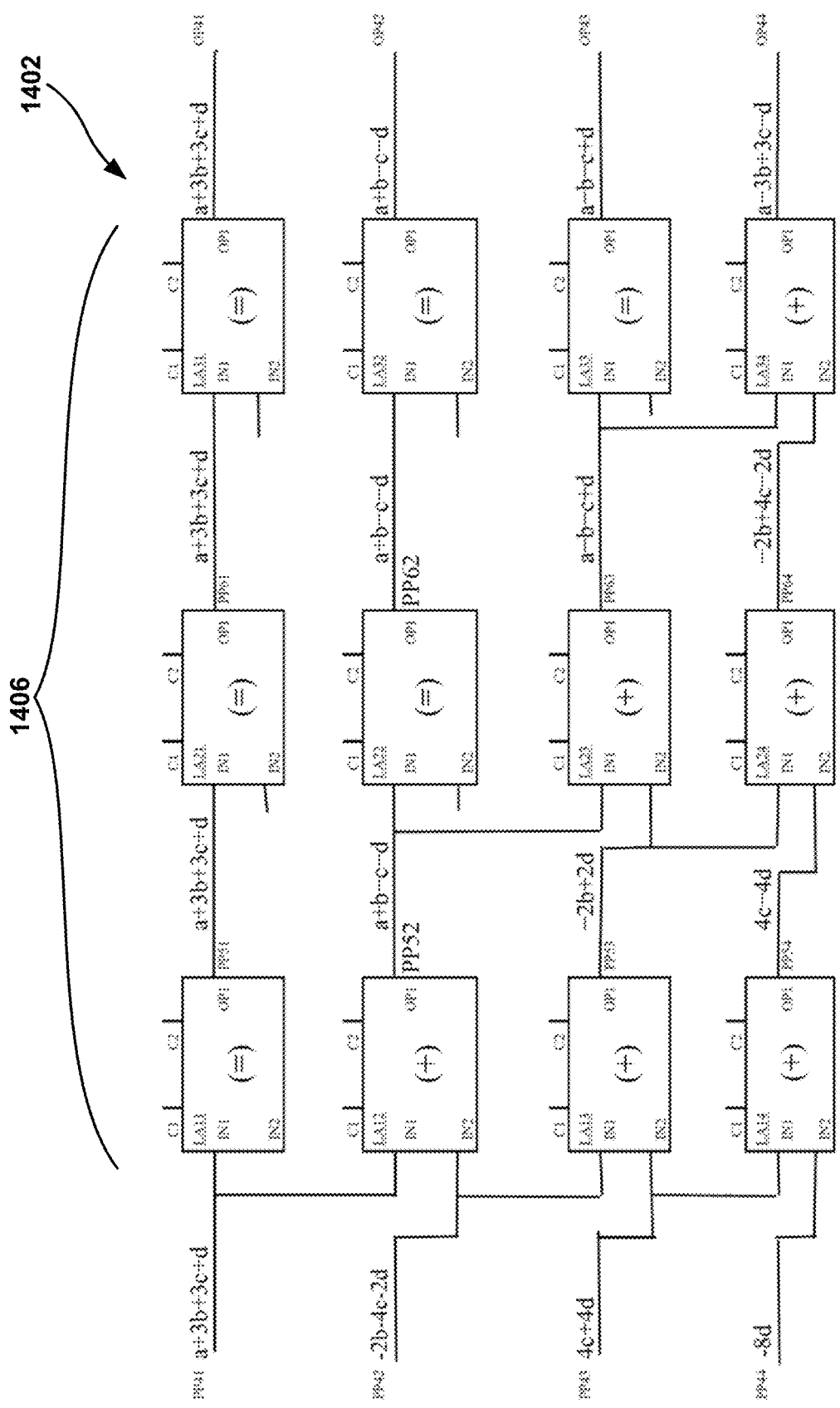
FIG. 14B shows a plurality of lower adder engines of the binomial matrix processor of FIG. 14, according to an aspect of the present disclosure.

Now, referring to FIGS. 14A and 14B configuration of a plurality of upper adder engines 1404, a plurality of lower adder engines 1406 and a plurality of shift engine 1408 of the binomial matrix processor 1402 for binomial submatrix type B4 is described. FIG. 14A shows the dataflow between plurality of upper adder engines 1404 and plurality of shift engines 1408. FIG. 14B shows the dataflow between plurality of lower adder engines 1406.

Now, referring to FIG. 14A, plurality of upper adder engines 1404 are selectively configured as an adder (indicated by a "+" sign) or as a pass through (indicated by a "=" sign), as previously described. Each of the adder engines has two inputs IN1 and IN2 and one output OP1. Each of the adder engines also has one or more control lines. For example, each of the adder engines has two control lines C1 and C2. As one skilled in the art appreciates, control lines C1 and C2 may be selectively used to configure the adder engine to either add the two inputs at input IN1 and IN2 and provide the sum of the inputs at output OP1 or pass through the input at input IN1 to output OP1.

FIG. 14A also shows the plurality of adder engines UA11, UA12, UA 13, and UA14 of the first bank of adder engines 1410. These are selectively configured to provide first partial product PP1, when the input matrix IP4 1332 is multiplied with upper factorized matrix U1 1301. In this example, adder engines UA11, UA12, and UA13 are configured to add the input IN1 and IN2 and provide the sum at output OP1. And, the adder engine UA14 is configured as a pass through, to pass the input IN1 to the output OP1. For example, the elements of input matrix IP4 {{IP41, IP42, IP43, IP44}} are selectively fed to the plurality of adder engines UA11, UA12, UA 13, and UA 14 to generate the first partial product PP1. For example, the elements of the first partial product PP1 are designated as {{PP11, PP12, PP13, PP14}}.

Plurality of adder engines UA21, UA22, UA23, and UA24 of the second bank of adder engines 1412 are selectively configured to provide second partial product PP2, when the first partial product PP1 is multiplied with upper factorized matrix U2 1302. In this example, adder engines UA21, and UA22 are configured to add the input IN1 and IN2 and provide the sum at output OP1. And, the adder engines UA23 and UA34 are configured as a pass through, to pass the input IN1 to the output OP1. For example, the elements of first partial product PP1 {{PP11, PP12, PP13, PP14}} are selectively fed to the plurality of adder engines UA21, UA22, UA23, and UA24 to generate the second partial product PP2. For example, the elements of the second partial product PP2 are designated as {{PP21, PP22, PP23, PP24}}.

Plurality of adder engines UA31, UA32, UA33, and UA34 of the third bank of adder engines 1414 are selectively configured to provide third partial product PP3, when the second partial product PP2 is multiplied with upper factorized matrix U3 1303. In this example, adder engines UA31 is configured to add the input IN1 and IN2 and provide the sum at output OP1. And, the adder engines UA32, UA33 and UA34 are configured as a pass through, to pass the input IN1 to the output OP1. For example, the elements of second partial product PP2 {{PP21, PP22, PP23, PP24}} are selectively fed to the plurality of adder engines UA31, UA32, UA33, and UA34 to generate the third partial product PP3. For example, the elements of the third partial product PP3 are designated as {{PP31, PP32, PP33, PP34}}.

Plurality of shift engines SE41, SE42, SE43, and SE44 of the first bank of shift engines 1416 are selectively configured to provide fourth partial product PP4, when the third partial product PP3 is multiplied with the shift matrix S4 1330, as previously described. Each of the shift engine have one input designated as IN and one output designated as OUT. Each of the shift engines have control lines S1 and S2 which may be selectively used to configure the shift engine to perform required number of shifts and polarity change as required. For example, shift engine SE41 may be set as a pass through, as it is required to multiply the input by 1. Similarly shift engine SE42 is configured to multiply the input by (−2). Similarly, shift engine SE43 is configured to multiply the input by (4) and shift engine SE44 is configured to multiply by (−8). For example, the elements of the fourth partial product PP4 are designated as {{PP41, PP42, PP43, PP44}}.

Now, referring to FIG. 14B, plurality of lower adder engines 1406 are selectively configured as an adder (indicated by a "+" sign) or as a pass through (indicated by a "=" sign), as previously described. Each of the adder engines has two inputs IN1 and IN2 and one output OP1. Each of the adder engines also has one or more control lines. For example, each of the adder engines has two control lines C1 and C2. As one skilled in the art appreciates, control lines C1 and C2 may be selectively used to configure the adder engine to either add the two inputs at input IN1 and IN2 and provide the sum of the inputs at output OP1 or pass through the input at input IN1 to output OP1.

FIG. 14B also shows the plurality of adder engines LA11, LA12, LA13, and LA14 of the fourth bank of adder engines 1418. These are selectively configured to provide fifth partial product PP5, when the fourth partial product PP4 is multiplied with lower factorized matrix L1 1321. In this example, adder engines LA12, and LA13 are configured to add the input IN1 and IN2 and provide the sum at output OP1. And, the adder engine LA11 and LA14 are configured as a pass through, to pass the input IN1 to the output OP1. For example, the elements of fourth partial product PP44 {{PP41, PP42, PP43, PP44}} are selectively fed to the plurality of adder engines LA11, LA12, LA 13, and LA14 to generate the fifth partial product PP5. For example, the elements of the fifth partial product PP5 are designated as {{PP51, PP52, PP53, PP54}}.

Plurality of adder engines LA21, LA22, LA23, and LA24 of the fifth bank of adder engines 1420 are selectively configured to provide sixth partial product PP6, when the fifth partial product PP5 is multiplied with lower factorized matrix L2 1322. In this example, adder engines LA23, and LA24 are configured to add the input IN1 and IN2 and provide the sum at output OP1. And, the adder engines LA21 and LA22 are configured as a pass through, to pass the input IN1 to the output OP1. For example, the elements of fifth partial product PP5 {{PP51, PP52, PP53, PP54}} are selectively fed to the plurality of adder engines LA21, LA22, LA23, and LA24 to generate the sixth partial product PP6. For example, the elements of the sixth partial product PP6 are designated as {{PP61, PP62, PP63, PP64}}.

Plurality of adder engines LA31, LA32, LA33, and LA34 of the sixth bank of adder engines 1422 are selectively configured to provide output matrix OP4, when the sixth partial product PP6 is multiplied with lower factorized matrix L3 1323. In this example, adder engines LA34 is configured to add the input IN1 and IN2 and provide the sum at output OP1. And, the adder engines LA31, LA32 and LA33 are configured as a pass through, to pass the input IN1 to the output OP1. For example, the elements of sixth partial product PP6 {{PP61, PP62, PP63, PP64}} are selectively fed to the plurality of adder engines LA31, LA32, LA33, and LA34 to generate the output matrix OP4. For example, the elements of the output matrix OP4 are designated as {{OP41, OP42, OP43, OP44}}.

Figure 14C:
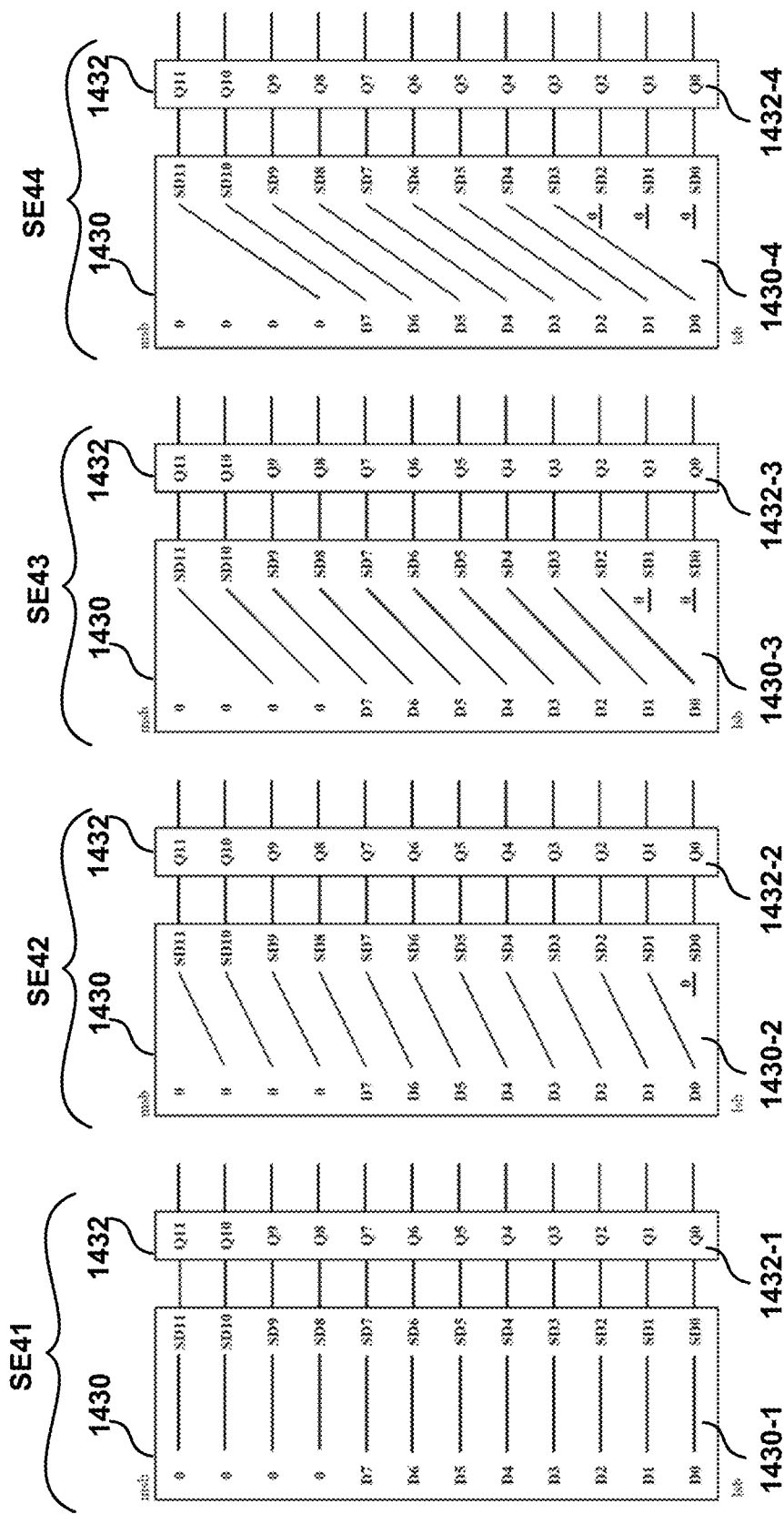
FIG. 14C shows an example shift matrix of the binomial matrix processor of FIG. 14, according to an aspect of the present disclosure.

Now, referring to FIG. 14C, an example implementation of the shift engines SE41, SE42, SE43, and SE44 of the first bank of shift engines 1416 is described. In this example, the input is a 8 bit word, with bits D0-D7. Each of the shift engines have a shift logic 1430 and a sign logic 1432. Shift logic 1430 have outputs SD0-SD11, with extra bits to permit multiplication of the input bits. The sign logic 1432 received outputs SD0-SD11 and perform selective multiplication of either (+1) or (−1), as required.

For example, shift engine SE41 may be set as a pass through, as it is required to multiply the input by (1). In this example, the signal lines of the shift logic 1430-1 are configured to be a pass through. In other words, input bits D0-D7 are passed through to outputs SD0-SD7 respectively. And, the sign logic 1431-1 is configured to multiply by (+1). In other words, there will be no change to the sign of output word at the output of sign logic 1431-1.

Similarly shift engine SE42 is configured to multiply the input by (−2). In this example, the signal lines of the shift logic 1430-2 are configured to shift the input bits by one position. In other words, input bits D0-D7 are shifted to outputs SD1-SD8 respectively. And, the sign logic 1431-2 is configured to multiply by (−1). In other words, there will be a change to the sign of output word at the output of sign logic 1431-2.

Similarly, shift engine SE43 is configured to multiply the input by (4). In this example, the signal lines of the shift logic 1430-3 are configured to shift the input bits by two position. In other words, input bits D0-D7 are shifted to outputs SD2-SD9 respectively. And, the sign logic 1431-3 is configured to multiply by (+1). In otherwords, there will be no change to the sign of output word at the output of sign logic 1431-3.

Similarly, shift engine SE44 is configured to multiply by (−8). In this example, the signal lines of the shift logic 1430-2 are configured to shift the input bits by three position. In other words, input bits D0-D7 are shifted to outputs SD1-SD9 respectively. And, the sign logic 1431-4 is configured to multiply by (−1). In otherwords, there will be a change to the sign of output word at the output of sign logic 1431-4.

Having described the construction and operation of the binomial matrix processor 1402 for a binomial matrix of the type B4, these teachings may be extended to factorize and process binomial matrix of other dimensions.

Now, referring back to FIG. 3, for a binomial submatrix type B3, for example, binomial submatrix 212c or 212f, there will be two lower factorized matrix with diagonal elements set to {1, 1, 1}, and lower diagonal elements set to {0, 1}, and {1, 1}. All other elements are set to zero. And, there will be two upper factorized matrix with diagonal elements set to {1, 1, 1}, and upper diagonal elements set to {0, 1}, and {1, 1}. All other elements are set to zero.

Similarly, for a binomial submatrix type B5, for example, 212a, a 5×5 matrix, there will be four lower factorized matrix with diagonal elements set to {1, 1, 1, 1, 1}, and lower diagonal elements set to {0, 0, 0, 1}, {0, 0, 1, 1}, {0, 1, 1, 1} and {1, 1, 1, 1}. All other elements are set to zero. And, there will be four upper factorized matrix with diagonal elements set to {1, 1, 1, 1} and upper diagonal elements set to {0, 0, 0, 1}, {0, 0, 1, 1}, {0, 1, 1, 1}, and {1, 1, 1, 1} respectively. All other elements are set to zero.

Similarly, for a binomial submatrix type B6, for example, 212b, a 6×6 matrix, there will be five lower factorized matrix with diagonal elements set to {1, 1, 1, 1, 1, 1}, and lower diagonal elements set to {0, 0, 0, 0, 1}, {0, 0, 0, 1, 1}, {0, 0, 1, 1, 1}, {0, 1, 1, 1, 1}, and {1, 1, 1, 1, 1}. All other elements are set to zero. And, there will be five upper factorized matrix with diagonal elements set to {1, 1, 1, 1} and upper diagonal elements set to {11, 1,1, 1, 1, 1}, and upper diagonal elements set to {0, 0, 0, 0, 1}, {0, 0, 0, 1, 1}, {0, 0, 1, 1, 1}, {0, 1, 1, 1, 1}, and {1, 1, 1, 1, 1} respectively. All other elements are set to zero.

Similarly, for a binomial submatrix type B7, for example, 212d, a 7×7 matrix, there will be six lower factorized matrix with diagonal elements set to {1, 1, 1, 1, 1, 1, 1}, and lower diagonal elements set to {0, 0, 0, 0, 0, 1}, {0, 0,0, 0, 1, 1}, {0, 0, 0, 1, 1, 1}, {0, 0, 1,1, 1, 1}, {0, 1, 1, 1, 1, 1}, and {11, 1,1, 1, 1, 1}. All other elements are set to zero. And, there will be five upper factorized matrix with diagonal elements set to {1, 1, 1, 1, 1, 1}, and upper diagonal elements set to {0, 0, 0, 0, 0, 1}, {0, 0,0, 0, 1, 1}, {0, 0, 0, 1, 1, 1}, {0, 0, 1, 1,1, 1}, {0, 1, 1, 1, 1, 1}, and {1, 1, 1, 1, 1, 1} respectively. All other elements are set to zero.

For a shift matrix for submatrix type B3 will be a shift matrix S3, which is a 3×3 matrix, with three diagonal elements, with diagonal element values of 1, −2, 4, −8. All other elements are zero.

For a shift matrix for submatrix type B5 will be shift matrix S5 which is a 5×5 matrix, with five diagonal elements, with diagonal element values of 1, −2, 4, −8, 16. All other elements are set to zero.

A shift matrix for submatrix type B6 will be shift matrix S6 which is a 6×6 matrix, with six diagonal elements, with diagonal element values of 1, −2, 4, −8, 16, 32. All other elements are set to zero.

A shift matrix for submatrix type B7 will be shift matrix S7 which is a 7×7 matrix, with seven diagonal elements, with diagonal element values of 1, −2, 4, −8, 16, 32, −64. All other elements are set to zero.

As one skilled in the art appreciates all binomial matrix of different sizes may be correspondingly represented by a plurality of lower factorized matrix, upper factorized matrix and a shift matrix that corresponds to the size of the binomial matrix. And, the product of the plurality of lower factorized matrix, upper factorized matrix and the shift matrix represents the corresponding binomial matrix. And, the binomial matrix processor may be extended with additional banks of adder engines and shift engines to represent a larger multiplier matrix, for example, multiplier matrix 206 as shown in FIG. 3.

Figure 14D:
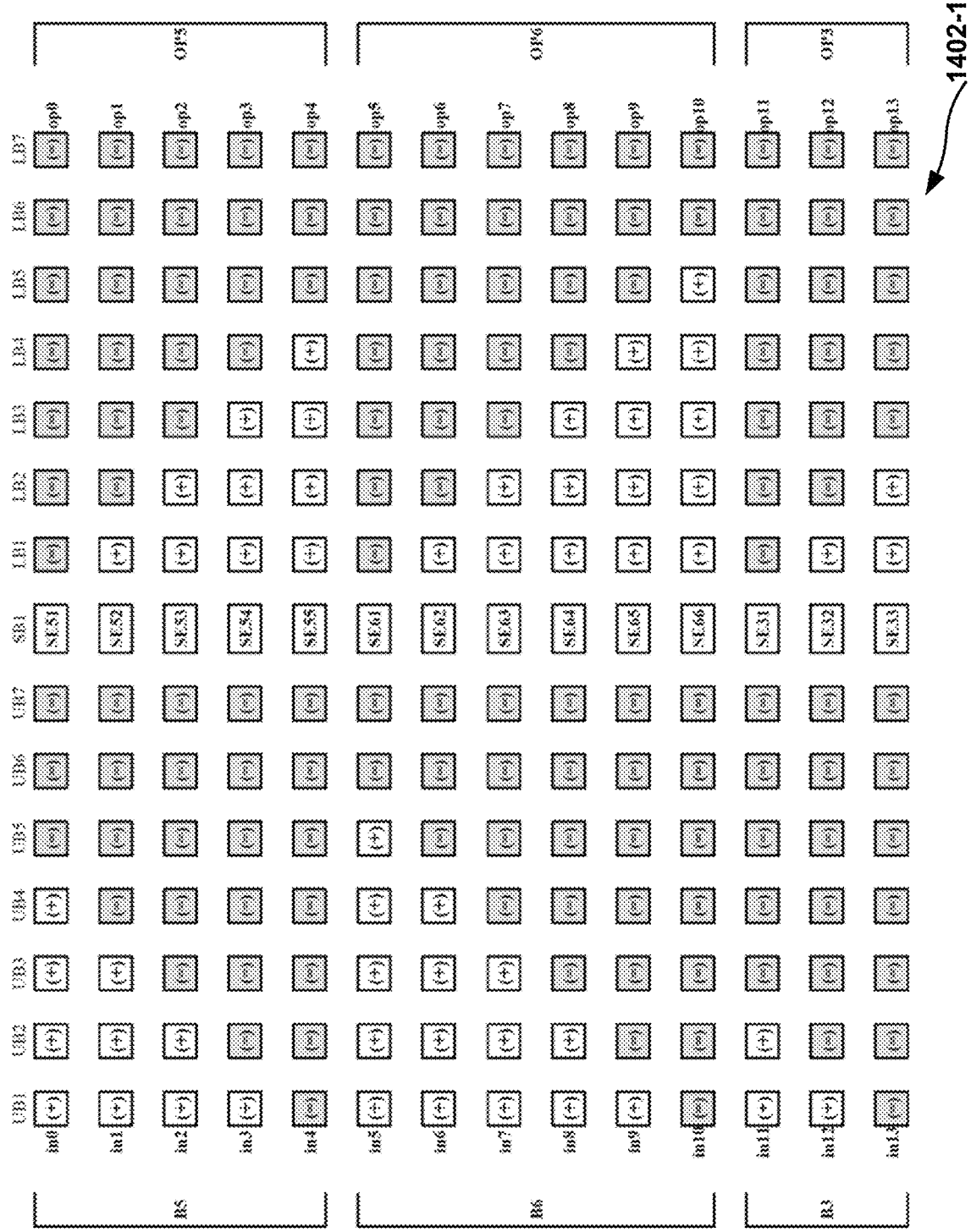
FIGS. 14D and 14E show an alternate binomial matrix processor, according to an aspect of the present disclosure.
Figure 14E:
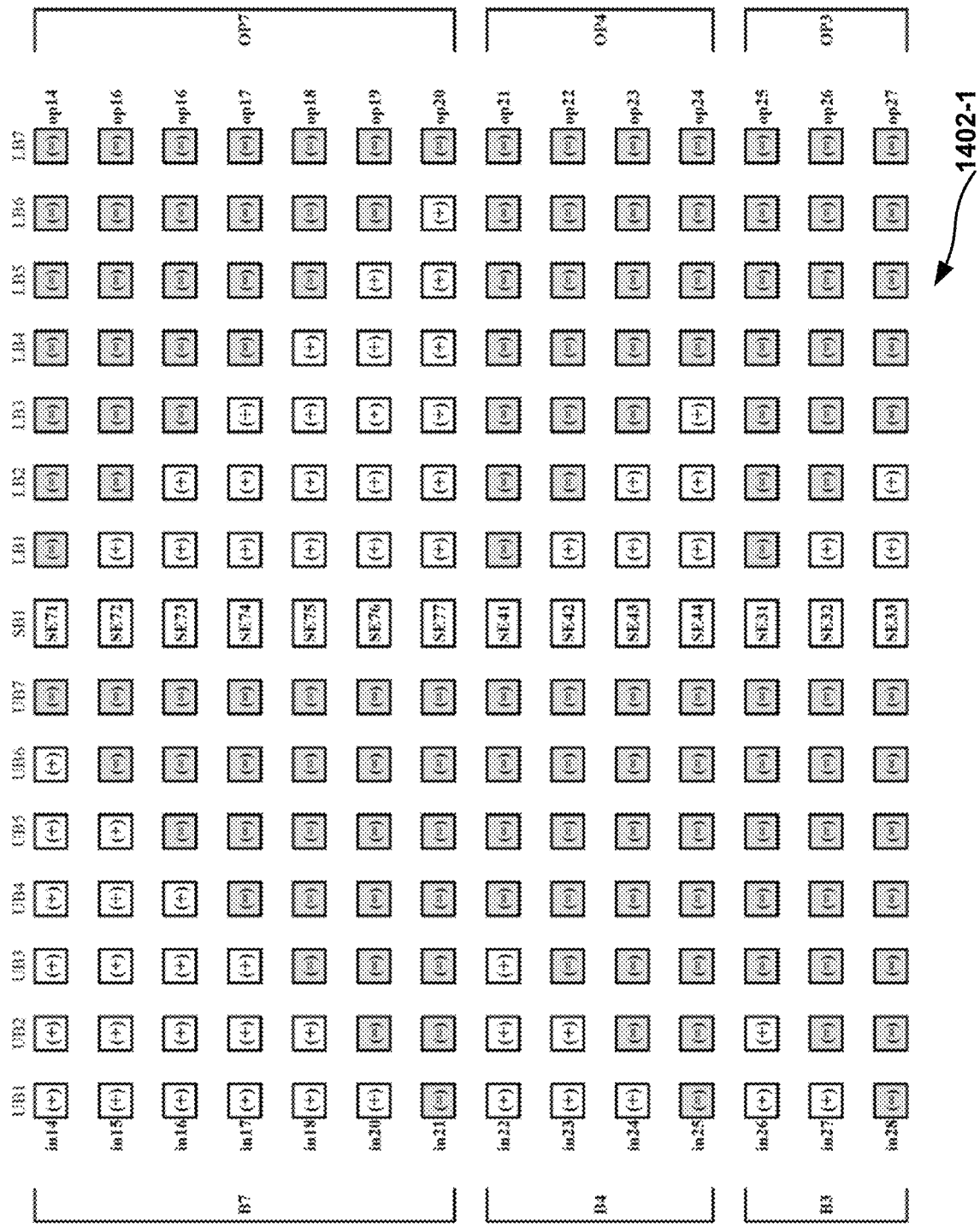

Referring to FIGS. 14D and 14E, an alternate binomial matrix processor 1402-1 is disclosed. The binomial matrix processor 1402-1 is configured to process the matrix 206, a 28×28 matrix, which includes a B5 binomial matrix 212a, a B6 binomial matrix 212b, a B3 binomial matrix 212c, a B7 binomial matrix 212d, a B4 binomial matrix 212e and a B3 binomial matrix 212f. Various adder engines and shift engines are selectively configured to represent an upper factorized matrix, a lower factorized matrix and a shift matrix for each of the binomial matrix 212a, 212b, 212c, 212d, 212e and 212f. Each of the adder engines are selectively configured to either add the inputs and provide the sum at the output or pass through the input to the output, as previously described.

The binomial matrix processor 1402-1 includes seven banks of adder engines UB1, UB2, UB3, UB4, UB5, UB6, and UB7, one bank of shift engine SB1 and seven banks of adder engines LB1, LB2, LB3, LB4, LB5, LB6, and LB7. One or more of adder engines in the seven banks of adder engines UB1, UB2, UB3, UB4, UB5, UB6, and UB7 may be selectively configured to perform selective multiplication of upper factorized matrix for each of the binomial matrix B5, B6, B3, B7, B4 and B3, with input matrix and one or more of the partial product matrix as appropriate. Final partial product of this multiplication is processed by selective one or more of the shift engines of the bank of shift engine B1.

One or more of adder engines in the seven banks of adder engines LB1, LB2, LB3, LB4, LB5, LB6, and LB7 may be selectively configured to perform selective multiplication of lower factorized matrix for each of the binomial matrix B5, B6, B3, B7, B4 and B3, with output of selective one or more of the shift engines and one or more of the partial product matrix as appropriate.

For example, referring to FIG. 14E, for binomial matrix B4, input matrix {{in22, in23, in24, in25}} correspond to the input matrix IP4 with elements {{IP41, IP42, IP43, IP44}} as shown in FIG. 14A. We also notice that selective adder engines within the adder engine banks UB1, UB2, and UB3 are selectively configured as an adder or a pass through, as previously described with reference to FIG. 14A with reference to first bank of adder engines 1410, second bank of adder engines 1412, and third bank of adder engines 1414. Selective adder engines within the adder engine banks UB4, UB5, UB6, and UB7 are extra adders which are not needed for a B4 binomial matrix and so are configured as a pass through engine. Shift engines SE41, SE42, SE43, and SE44 correspond to selective shift engines in the shift engine bank 1416 as shown in FIG. 14A.

Similarly, selective adder engines within the adder engine banks LB1, LB2, and LB3 are selectively configured as an adder or a pass through, as previously described with reference to FIG. 14B with reference to fourth bank of adder engines 1418, fifth bank of adder engines 1420, and sixth bank of adder engines 1422. Selective adder engines corresponding to adder engine banks LB4, LB5, LB6, and LB7 are extra adders which are not needed for a B4 binomial matrix and so are configured as a pass through engine.

Finally, output matrix elements {{OP21, OP22, OP23, and OP24}} correspond to the output matrix OP4 1333 with elements {{OP41, OP42, OP43, OP44}} of FIG. 14B.

As one skilled in the art appreciates, the binomial matrix processor described above is implemented using reconfigurable adder arrays to perform the matrix multiplication. The performance of a matrix multiplier is measured by "multiply accumulate" operations, which involves a series of multiplications and additions. However, binomial matrix processor described herein may be configured to perform matrix multiplication by primarily using reconfigurable adders. This can result in significant reduction in hardware complexity and associated reduction in power consumption.

The binomial matrix transform processor described herein may be configured to transform a block of original data and generate a transformed block of original data. In one example, the transformed block of original data is indicative of an anonymized block of original data. In some examples, the transformed block of original data may reveal features of the original data that may not be readily apparent in the original data.

Data Inflation:

In some examples, each of the elements of the matrix may be represented using a predefined number of bits, however, the matrix multiplication may result in elements of the matrix which may require more number of bits than the predefined number of bits. This may be sometimes referred to as data inflation. In some examples, it may be desirable to keep the number of bits required to represent the elements of the matrix within a predefined number of bits. An example implementation to avoid data inflation will now be described. This example uses Galois Field arithmetic (sometimes referred to as GF). The Galois Field arithmetic is sometimes referred to as finite field arithmetic. The Galois Field arithmetic operate on input vectors of a given word width, say 24-bit such that the output data vectors never exceed the input word width and linear transforms such as matrix multiplication are reversible.

Now, referring to FIG. 15, an example sub matrix multiplication which demonstrates data inflation is shown. FIG. 15 shows an example binomial sub matrix 1502 of the size 5×5. The sub matrix 1502 may be part of a multiplier matrix as previously described. In one example, the sub matrix 1502 corresponds to sub matrix 212a shown and described in FIG. 6, which is the same sub matrix shown in FIGS. 7, 8, 9, 10, 11 and 12. Another example original data matrix 1504 is also shown. In this example, elements of both the sub matrix 1502 and original data matrix may be represented as binary numbers with 8 bits of data. The sub matrix 1502 is multiplied with the original data matrix 1504 to generate an example output matrix 1506. As one skilled in the art appreciates, some of the elements of the resulting output matrix 1506 require more than 8 bits to represent them as binary numbers. For example, all the elements of the output matrix 1506, except the element with a value of 78 require more than 8 bits to be represented as a binary number. In other words, the matrix multiplication resulted in a data inflation. In one example, the output matrix 1506 represents a modified original data matrix.

Figure 16A:
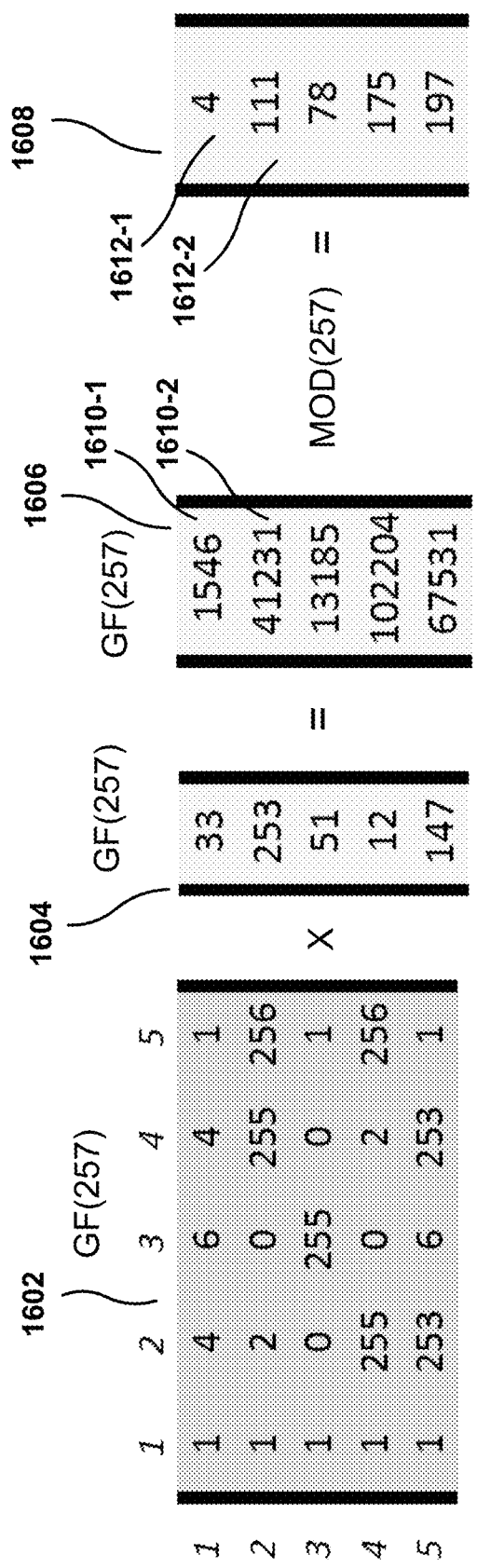
FIGS. 16A and 16B show an example encryption and decryption of the sub matrix of FIG. 15 using Galois Field arithmetic, according to an aspect of the present disclosure.
Figure 16B:
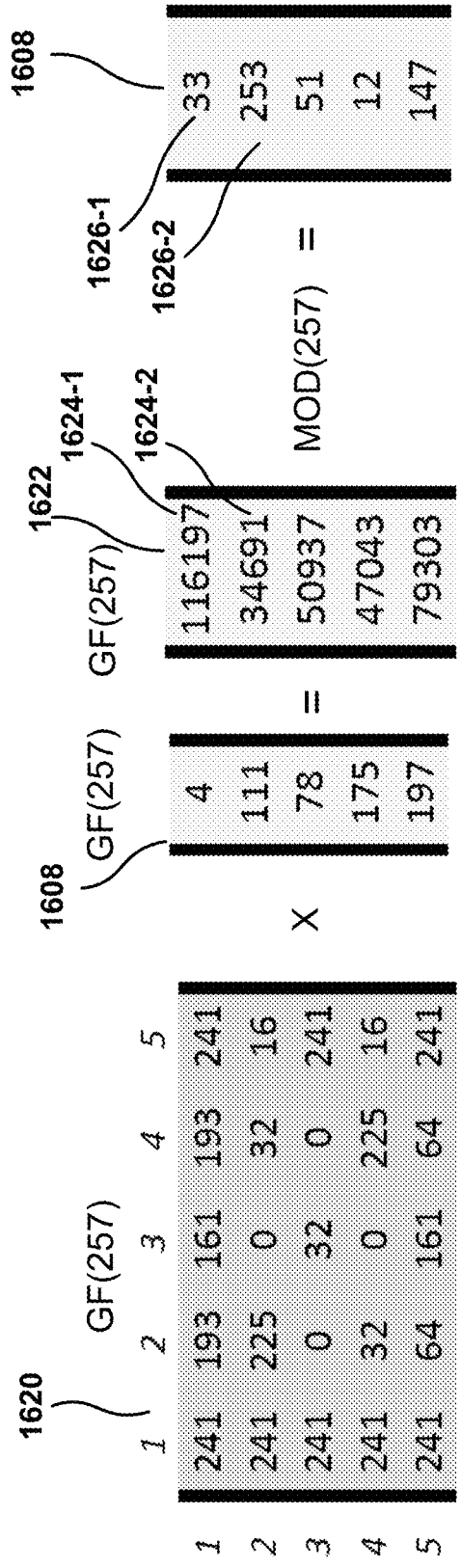

Now, referring to FIGS. 16A and 16B, an example encryption and decryption using Galois Field arithmetic of the order GF(K), where K is an integer prime number is described. Referring to FIG. 16A, example sub matrix 1502 described with reference to FIG. 15 is shown as sub matrix 1602, in GF(257). In this example, K is equal to 257. In a GF(257) Galois Field arithmetic, as one skilled in the art appreciates, both positive and negative numbers are represented between 0 to 256. For example, 1 is represented as 1, 4 is represented as 4, −1 is represented as 256, −2 is represented as 255, and −4 is represented as 253. In general, a positive number "p" is represented as "p" and a negative number "−p" is represented as "257−p" in a GF(257) representation.

The original data matrix 1604 is also represented in GF(257), which is same as the data matrix 1504 shown in FIG. 15. When the sub matrix 1602 is multiplied by the original data matrix 1604, an interim output matrix 1606 is generated. Each element of the interim output matrix 1606 is divided by 257 and remainder is represented in the output matrix 1608. As one skilled in the art appreciates, this step is generally referred to as a "modulo(257)" operation. For example, referring to element 1610-1 of interim output matrix 1606 with a value of 1546 is divided by 257, which results in a remainder of 4. In other words, (1546−6×257)=4. So, the value of the element 1612-1 of output matrix 1608 is 4. Similarly, referring to element 1610-2 of interim output matrix 1606 with a value of 41231 is divided by 257, which results in a remainder of 111. In other words, (41231−160×257)=111. So, the value of the element 1612-2 of output matrix 1608 is 111.

As one skilled in the art appreciates, the output matrix 1608 has elements can be represented in binary number, with 8 bits of data. Also, the output matrix 1608 is obfuscated as compared to the original data matrix 1604, as the elements of the output matrix 1608 is different than the elements of the original data matrix 1604. In one example, the output matrix 1608 represents a modified original data matrix.

Now, referring to FIG. 16B, an example decryption of the output matrix 1608 represented in GF(257) will be described. Referring to FIG. 16B, inverse sub matrix 1620 is shown in GF(257), As one skilled in the art appreciates, the inverse sub matrix 1620 is an inverse matrix of the sub matrix 1602. In other words, multiplying the sub matrix 1602 with inverse sub matrix 1620 will result in an identity matrix. An identity matrix of the size P×P will have a plurality of elements $E_{i,j}$, where (i=1 to P) and (j=1 to P). And, each of the elements $E_{1,1}$, $E_{2,2}$, ... $E_{P,P}$ will be equal to 1 and all other elements will be equal to zero.

The inverse sub matrix 1602 is multiplied by the output matrix 1608 to generate an interim original data matrix 1622. A "modulo(257)" operation is performed on each of the elements of the interim original data matrix 1622 to derive the original data matrix 1604. For example, referring to element 1624-1 of interim original data matrix 1622 with a value of 116197 is divided by 257, which results in a remainder of 33. In other words, (116197−452×257)=33. So, the value of the element 1626-1 of original data matrix 1604 is 33. Similarly, referring to element 1624-2 of interim original data matrix 1622 with a value of 34691 is divided by 257, which results in a remainder of 253. In other words, (34691−134×257)=253. So, the value of the element 1626-2 of original data matrix 1604 is 253.

As one skilled in the art appreciates, above example is described with reference to a sub matrix for simplicity. However, a multiplier matrix with a plurality of sub matrices may also be represented using the Galois Field arithmetic and used to perform encryption and decryption as described above.

As one skilled in the art appreciates, as described above, by using finite field arithmetic (or Galois Field arithmetic), potential for data inflation can be avoided. Although example has been described with reference to a Galois Field arithmetic, other arithmetic operations can be advantageously used to minimize or eliminate data inflation during matrix multiplication.

Figure 17:
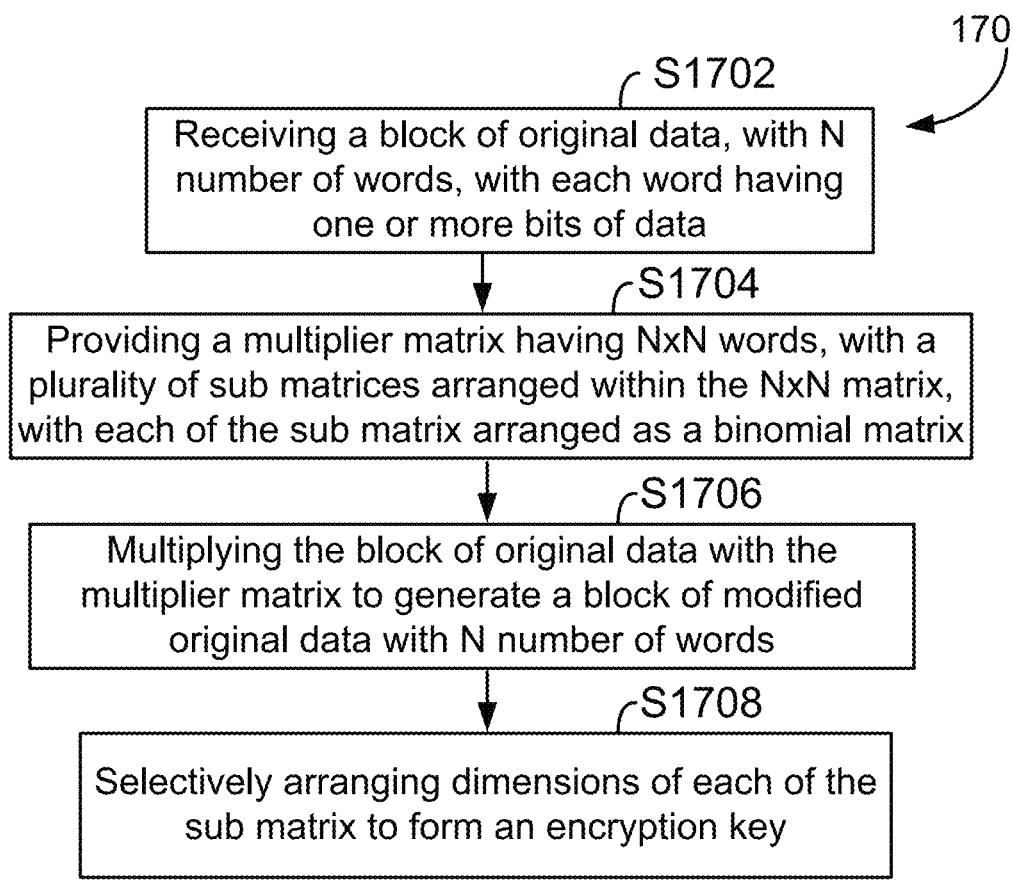
FIG. 17 shows an example flow diagram to encrypt a block of data, according to an aspect of the present disclosure.

Now, referring to FIG. 17, an example flow diagram 1700 is described, to encrypt a block of original data. In block S1702, a block of original data, with N number of words, with each word having one or more bits of data is received. For example, the encryption system 100 of FIG. 1 receives the block of original data. For example, the receiver 102 of the encryption system 100 receives the block of original data.

In block S1704, a multiplier matrix having N×N words, with a plurality of sub matrices arranged within the N×N matrix, with each of the sub matrix arranged as a binomial matrix is generated. For example, the encryption engine 104 of the encryption engine generates the multiplier matrix. The sub matrix generator 202 of the encryption engine generates the multiplier matrix 206.

In block S1706, the block of original data is multiplied with the multiplier matrix to generate a block of modified original data with N number of words. For example, the encryption engine 104 of the encryption system 100 multiplies the block of original data with the multiplier matrix to generate a block of modified original data with N number of words. For example, the matrix multiplier 204 receives the multiplier matrix 206 and the original data matrix 208. The multiplier matrix 204 multiplies the multiplier matrix 206 and the original data matrix 208 to generate the modified original matrix 210.

In block S1708, the dimensions of each of the sub matrix is selectively arranged to form an encryption key. In some examples, the encryption key refers to the sub matrix key. In one example, the sub matrix generator 202 may generate the sub matrix key 212. In some examples, the sub matrix key 212 may be obfuscated.

Figure 17A:
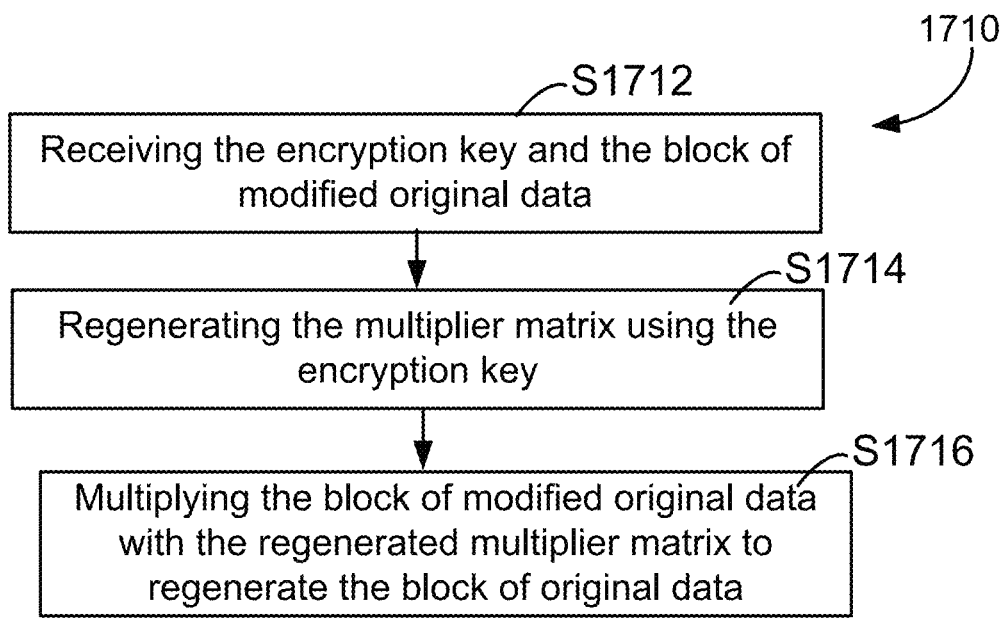
FIG. 17A shows an example flow diagram to decrypt a block of encrypted data, according to an aspect of the present disclosure.

Now, referring to FIG. 17A, an example flow diagram 1710 is described, to decrypt a block of modified original data. In block S1712, encryption key and block of modified original data is received. For example, receiver 102 of the encryption system 100 may receive the block of modified original data 210. In one example, the receiver 100 may also receive the encryption key, for example, the sub matrix key 212.

In block S1714, the multiplier matrix is regenerated using the encryption key. In one example, the matrix generator 214 of the decryption engine 122 may receive the encryption key and using the encryption key, regenerate the multiplier matrix 206.

In block S1716, the block of modified original data is multiplied with the regenerated multiplier matrix to regenerate the block of original data. In one example, the matrix multiplier 204 multiplies the regenerated multiplier matrix 206 with the modified original data 210 to regenerate the block of original data 208. The regenerated block of original data 208 is then transmitted by the transmitter 110 to the destination computing device.

The embodiments disclosed herein can be implemented through at least one software program running on at least one hardware device and performing various functions of the encryption system. Various functions of the encryption system as described herein can be at least one of a hardware device, or a combination of hardware device and software module. One or more components of the encryption system may be executed separately. For example, the encryption engine may be run in one system and the decryption engine may be run in a different system.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method to transform a block of data, comprising:
retrieving a block of original data from a data store by a receiver, block of original data including a N number of words, each word including one or more bits of data;
providing a sub matrix generator executed in an encryption engine of an encryption system executed on a computing system with at least one processor and memory, the sub matrix generator generating a multiplier matrix, the multiplier matrix having N×N words, a plurality of sub matrices arranged diagonally within the multiplier matrix, with each of the sub matrix arranged as a binomial matrix, and all the words in the multiplier matrix not part of the sub matrix set to zero;
representing each of the sub matrix as a product of a plurality of lower factorized matrices, a plurality of upper factorized matrices and a shift matrix;
multiplying the block of original data with the multiplier matrix by a matrix multiplier executed in the encryption system, with each of the sub matrix represented as a product of the plurality of lower factorized matrices, the plurality of upper factorized matrices and the shift matrix to generate a block of modified original data with N number of words, wherein the block of modified original data is indicative of an anonymized block of original data;
selectively arranging the dimensions of each of the sub matrix to form an encryption key, providing a decryption engine;
receiving the encryption key and the modified original data by the decryption engine;
regenerating the multiplier matrix using the encryption key, by the decryption engine; and
multiplying the modified original data with the regenerated multiplier matrix by the decryption engine to regenerate the block of original data, and
wherein the matrix multiplier includes a plurality of adders, wherein, for each of the sub matrix, a first set of a plurality of adders are selectively configured to yield a first interim product of the plurality of upper factorized matrices multiplied with a selective portion of the block of original data corresponding to the sub matrix.

2. The method of claim 1, wherein selectively arranging the dimensions of each of the sub matrix to form the encryption key includes sequentially arranging the dimensions of each of the sub matrix.

3. The method of claim 1, wherein selectively arranging the dimensions of each of the sub matrix to form the encryption key includes obfuscating sequence of the dimensions of each of the sub matrix.

4. The method of claim 1, wherein the block of modified original data is divided into a plurality of sub blocks, the size of the sub blocks corresponding to the dimensions of each of the sub matrix, with each of the sub blocks having a weighted coefficient word and one or more differential coefficient word, a sum of the modulus of all of the differential coefficient words divided by the number of differential coefficient words indicative of an aggregate energy of the block of modified original data.

5. The method of claim 4, further including:
generating a plurality of multiplier matrices by selectively changing the dimensions of one or more of the sub matrix;
multiplying the block of original data with the generated plurality of multiplier matrices to generate a plurality of interim modified original data matrices;

calculating aggregate energy for each of the generated plurality of interim modified original data matrices; and selectively designating one of the interim modified original data matrix with minimal aggregate energy as the modified original data matrix.

6. The method of claim 5, further including selectively arranging the dimensions of each of the sub matrix corresponding to the multiplier matrix that generated minimal aggregate energy to form the encryption key.

7. The method of claim 6, wherein selectively arranging the dimensions of each of the sub matrix to form the encryption key includes obfuscating sequence of the dimensions of each of the sub matrix.

8. The method of claim 6, wherein selectively arranging the dimensions of each of the sub matrix to form the encryption key includes sequentially arranging the dimensions of each of the sub matrix.

9. The method of claim 1, wherein the block of original data is indicative of an audio or visual data.

10. The method of claim 1, wherein the first interim product is selectively multiplied with the shift matrix to yield a second interim product.

11. The method of claim 10, wherein a second set of a plurality of adders are selectively configured to yield a third interim product of the plurality of lower factorized matrix multiplied with the second interim product, wherein the third interim product is a portion of the block of modified original data corresponding to the selective portion of the block of original data corresponding to the sub matrix.

12. A system to transform a block of data, comprising:
a receiver configured to retrieve a block of original data from a data store, block of original data including a N number of words, each word including one or more bits of data;
an encryption system with at least one processor and memory, including an encryption engine, the encryption engine including a sub matrix generator, and a matrix multiplier,
the sub matrix generator configured to generate a multiplier matrix, the multiplier matrix having N×N words, a plurality of sub matrices arranged diagonally within the multiplier matrix, with each of the sub matrix arranged as a binomial matrix, and all the words in the multiplier matrix not part of the sub matrix arranged as a binomial matrix set to zero;
each of the sub matrix represented as a product of a plurality of lower factorized matrices, a plurality of upper factorized matrices and a shift matrix;
the matrix multiplier configured to multiply the block of original data with the generated multiplier matrix, with each of the sub matrix represented as a product of the plurality of lower factorized matrices, the plurality of upper factorized matrices, and the shift matrix to generate a block of modified original data with N number of words, wherein the block of modified original data is indicative of an anonymized block of original data;
the encryption engine configured to selectively arrange the dimensions of each of the sub matrix to form an encryption key;
a decryption engine configured to receive the encryption key and the modified original data by the decryption engine; the decryption engine configured to regenerate the multiplier matrix using the encryption key; and the decryption engine configured to multiply the modified original data with the regenerated multiplier matrix to regenerate the block of original data, and wherein the matrix multiplier includes a plurality of adders, wherein, for each of the sub matrix, a first set of a plurality of adders are selectively configured to yield a first interim product of the plurality of upper factorized matrices multiplied with a selective portion of the block of original data corresponding to the sub matrix.

13. The system of claim 12, wherein the block of original data is indicative of an audio or visual data.

14. The system of claim 12, wherein selectively arranging the dimensions of each of the sub matrix to form the encryption key includes sequentially arranging the dimensions of each of the sub matrix.

15. The system of claim 12, wherein selectively arranging the dimensions of each of the sub matrix to form the encryption key includes obfuscating sequence of the dimensions of each of the sub matrix.

16. The system of claim 12, wherein the block of modified original data is divided into a plurality of sub blocks, the size of the sub blocks corresponding to the dimensions of each of the sub matrix, with each of the sub blocks having a weighted coefficient word and one or more differential coefficient word, a sum of the modulus of all of the differential coefficient words divided by the number of differential coefficient words indicative of an aggregate energy of the block of modified original data.

17. The system of claim 16, further configured to
generate a plurality of multiplier matrices by selectively changing the dimensions of one or more of the sub matrix;
multiply the block of original data with the generated plurality of multiplier matrices to generate a plurality of interim modified original data matrices;
calculate aggregate energy for each of the generated plurality of interim modified original data matrices; and
selectively designate one of the interim modified original data matrix with minimal aggregate energy as the modified original data matrix.

18. The system of claim 17, further configured to selectively arrange the dimensions of each of the sub matrix corresponding to the multiplier matrix that generated minimal aggregate energy to form the encryption key.

19. The system of claim 18, wherein selectively arranging the dimensions of each of the sub matrix to form the encryption key includes obfuscating sequence of the dimensions of each of the sub matrix.

20. The system of claim 18, wherein selectively arranging the dimensions of each of the sub matrix to form the encryption key includes sequentially arranging the dimensions of each of the sub matrix.

21. The system of claim 12, wherein the first interim product is selectively multiplied with the shift matrix to yield a second interim product.

22. The system of claim 21, wherein a second set of a plurality of adders are selectively configured to yield a third interim product of the plurality of lower factorized matrix multiplied with the second interim product, wherein the third interim product is a portion of the block of modified original data corresponding to the selective portion of the block of original data corresponding to the sub matrix.

* * * * *